United States Patent
Hagihara

(10) Patent No.: US 9,106,860 B2
(45) Date of Patent: Aug. 11, 2015

(54) AD CONVERSION CIRCUIT AND SOLID-STATE IMAGE PICKUP DEVICE

(71) Applicant: OLYMPUS CORPORATION, Tokyo (JP)

(72) Inventor: Yoshio Hagihara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 169 days.

(21) Appl. No.: 13/952,947

(22) Filed: Jul. 29, 2013

(65) Prior Publication Data

US 2014/0036122 A1    Feb. 6, 2014

(30) Foreign Application Priority Data

Aug. 3, 2012  (JP) ................................. 2012-173174

(51) Int. Cl.
*H04N 5/378*  (2011.01)

(52) U.S. Cl.
CPC ..................................... *H04N 5/378* (2013.01)

(58) Field of Classification Search
CPC .... H04N 5/374; H04N 3/1506; H04N 3/1575
USPC ............... 348/302–304, 307–310; 250/208.1; 341/164
See application file for complete search history.

(56) References Cited

U.S. PATENT DOCUMENTS

| | | | | |
|---|---|---|---|---|
| 7,629,913 | B2 * | 12/2009 | Okumura | 341/155 |
| 8,704,696 | B2 * | 4/2014 | Hagihara | 341/169 |
| 2008/0192127 | A1 * | 8/2008 | Sakai et al. | 348/222.1 |
| 2013/0134296 | A1 * | 5/2013 | Hagihara | 250/208.1 |
| 2013/0327925 | A1 * | 12/2013 | Hagihara | 250/208.1 |

FOREIGN PATENT DOCUMENTS

| | | |
|---|---|---|
| JP | 63-263828 A | 10/1988 |
| JP | 2006-262448 A | 9/2006 |
| JP | 2007-306302 A | 11/2007 |
| JP | 2008-092091 A | 4/2008 |
| JP | 2009-038726 A | 2/2009 |
| JP | 2010-050529 A | 3/2010 |
| JP | 2012-039386 A | 2/2012 |

OTHER PUBLICATIONS

Notice of Allowance dated Jan. 6, 2015, issued in Japanese Application No. 2012-173174, w/English translation. (6 pages).

* cited by examiner

*Primary Examiner* — Twyler Haskins
*Assistant Examiner* — Carramah J Quiett
(74) *Attorney, Agent, or Firm* — Westerman, Hattori, Daniels & Adrian, LLP

(57) ABSTRACT

An AD conversion circuit may include: a reference signal generation unit; a comparison unit; a clock generation unit; a latch unit; a counting unit; and an encoding unit including a detection circuit and an encoding circuit, the detection circuit performing a first detection operation of detecting logic states of n lower phase signals in a signal group that a plurality of lower phase signals latched in the latch unit are arranged in the same order as those of the signal group when the plurality of lower phase signals output from the clock generation unit are arranged to be the signal group the detection circuit outputting a state detection signal when the logic state of the n lower phase signals is detected to be a predetermined logic state in the first detection operation, the encoding circuit performing encoding based on the state detection signal output from the detection circuit.

4 Claims, 16 Drawing Sheets

FIG. 14

| ENCODING VALUE | CK[15] | CK[13] | CK[11] | CK[9] | CK[7] | CK[5] | CK[3] | CK[1] | CK[14] | CK[12] | CK[10] | CK[8] | CK[6] | CK[4] | CK[2] | CK[0] |
|---|---|---|---|---|---|---|---|---|---|---|---|---|---|---|---|---|
| 0 | 1 | 1 | 1 | 1 | 1 | 1 | 1 | 1 | 0 | 0 | 0 | 0 | 0 | 0 | 0 | 0 |
| 1 | 1 | 1 | 1 | 1 | 1 | 1 | 1 | 1/0 | 0 | 0 | 0 | 0 | 0 | 0 | 0 | 0 |
| 2 | 1 | 1 | 1 | 1 | 1 | 1 | 1/0 | 0 | 0 | 0 | 0 | 0 | 0 | 0 | 0 | 0 |
| 3 | 1 | 1 | 1 | 1 | 1 | 1/0 | 0 | 0 | 0 | 0 | 0 | 0 | 0 | 0 | 0 | 0 |
| 4 | 1 | 1 | 1 | 1 | 1/0 | 0 | 0 | 0 | 0 | 0 | 0 | 0 | 0 | 0 | 0 | 0 |
| 5 | 1 | 1 | 1 | 1/0 | 0 | 0 | 0 | 0 | 0 | 0 | 0 | 0 | 0 | 0 | 0 | 0 |
| 6 | 1 | 1 | 1/0 | 0 | 0 | 0 | 0 | 0 | 0 | 0 | 0 | 0 | 0 | 0 | 0 | 0 |
| 7 | 1 | 1/0 | 0 | 0 | 0 | 0 | 0 | 0 | 0 | 0 | 0 | 0 | 0 | 0 | 0 | 0 |
| 8 | 1/0 | 0 | 0 | 0 | 0 | 0 | 0 | 0 | 0 | 0 | 0 | 0 | 0 | 0 | 0 | 1/0 |
| 9 | 0 | 0 | 0 | 0 | 0 | 0 | 0 | 0 | 0 | 0 | 0 | 0 | 0 | 0 | 1/0 | 0 |
| 10 | 0 | 0 | 0 | 0 | 0 | 0 | 0 | 0 | 0 | 0 | 0 | 0 | 0 | 1/0 | 0 | 0 |
| 11 | 0 | 0 | 0 | 0 | 0 | 0 | 0 | 1 | 0 | 0 | 0 | 0 | 1/0 | 0 | 0 | 0 |
| 12 | 0 | 0 | 0 | 0 | 0 | 0 | 1 | 1 | 0 | 0 | 0 | 1/0 | 0 | 0 | 0 | 0 |
| 13 | 0 | 0 | 0 | 0 | 0 | 1 | 1 | 1 | 0 | 0 | 1/0 | 0 | 0 | 0 | 0 | 0 |
| 14 | 0 | 0 | 0 | 0 | 1 | 1 | 1 | 1 | 0 | 1/0 | 0 | 0 | 0 | 0 | 0 | 0 |
| 15 | 0 | 1 | 1 | 1 | 1 | 1 | 1 | 1 | 1/0 | 0 | 0 | 0 | 0 | 0 | 0 | 0 |

LOWER PHASE SIGNAL INPUT TO LATCH UNIT 1108 CIRCULATES OVER TIME.

FIG. 16

| ENCODING VALUE | CK[15] | CK[13] | CK[11] | CK[9] | CK[7] | CK[5] | CK[3] | CK[1] | CK[14] | CK[12] | CK[10] | CK[8] | CK[6] | CK[4] | CK[2] | CK[0] |
|---|---|---|---|---|---|---|---|---|---|---|---|---|---|---|---|---|
| 1 | 0 | 1 | 1 | 1 | 1 | 1 | 1 | 1 | 1/0 | 0 | 0 | 0 | 0 | 0 | 0 | 1 |

ENCODING VALUE SHOULD BE DETERMINED TO BE "15," BUT ENCODING VALUE IS DETERMINED TO BE "1."

AD CONVERSION CIRCUIT AND SOLID-STATE IMAGE PICKUP DEVICE

BACKGROUND OF THE INVENTION

1. Field of the Invention

The present invention relates to an AD conversion circuit and a solid-state image pickup device including this AD conversion circuit.

Priority is claimed on Japanese Patent Application No. 2012-173174, filed Aug. 3, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

As examples of a solid-state image pickup device using a TDC (=Time to Digital Converter) type AD conversion circuit, configurations described in Japanese Unexamined Patent Applications, First Publication Nos. 2008-92091 and 2009-38726 are known. FIG. 11 illustrates an extracted portion of a configuration of a TDC type AD conversion circuit when an oscillation circuit called a so-called "asymmetry type oscillation circuit" is used as a VCO (=Voltage Controlled Oscillator) of the AD conversion circuit. First, a configuration and an operation of the circuit of FIG. 11 will be described.

The circuit shown in FIG. 11 includes a VCO 1100, a latch unit 1108, a counting unit 1105, a detection circuit 1107, and an encoding circuit 1106. The VCO 1100 has an oscillation circuit in which 17 delay units (NAND circuits NAND[0] to NAND[16]) are connected in a ring form. The latch unit 1108 latches output signals (lower phase signals CK[0] to CK[16]) of the VCO 1100. The counting unit 1105 has a counter circuit that performs counting using the lower phase signal CK[15] from the NAND circuit NAND[15] output via the latch unit 1108 as a count clock. Further, the counting unit 1105 performs counting at a rising edge of the lower phase signal CK[15]. The detection circuit 1107 detects a predetermined logic state based on the lower phase signals CK[0] to CK[16] latched in the latch unit 1108. The encoding circuit 1106 encodes the logic state detected by the detection circuit 1107 into a binary number.

A start pulse StartP is input to one input terminal of the NAND circuit NAND0 constituting the VCO 1100, and an output signal of the NAND circuit NAND[16] is input to the other input terminal of the NAND circuit NAND0. A power supply voltage VDD is input to one input terminal of each of the NAND circuits NAND[1] to NAND[15], and an output signal of the NAND circuit of a preceding stage is input to the other input terminal. During an operation period of the AD conversion circuit, the power supply voltage VDD is set to a high level. An output signal of the NAND circuit NAND[13] is input to one input terminal of the NAND circuit NAND[16], and an output signal of the NAND circuit NAND[15] of a preceding stage is input to the other input terminal. The output signal of the NAND circuit NAND[13] is input to the NAND circuit NAND[16] after three stages, as well as the NAND circuit NAND[14] after one stage.

Next, an operation of the circuit shown in FIG. 11 will be described. FIG. 12 illustrates waveforms of the start pulse StartP and the output signals (the lower phase signals CK[0] to CK[16]) of the VCO 1100. First, as a logic state of the start pulse StartP changes from an L (Low) state to an H (High) state, the VCO 1100 starts a transition operation. In this transition operation, logic states of the signals output by the respective NAND circuits constituting the VCO 1100 change sequentially. The counting unit 105 starts counting and a reference signal generation unit (not shown) starts generation of a ramp wave (a reference signal) at the same time as the VCO 1100 starts the transition operation. The ramp wave generated by the reference signal generation unit is a signal whose level increases or decreases in one direction over time.

An analog signal as an AD conversion target and the ramp wave are input to a comparison unit (not shown). In parallel with this, the lower phase signals CK[0] to CK[16] are input to the latch unit 1108, and the lower phase signal CK[15] is input to the counting unit 105 via the latch unit 1108. When a magnitude relationship of the two input signals input to the comparison unit is changed, a comparison output CO of the comparison unit is inverted. At this time point, the latch unit 1108 latches logic states according to the lower phase signals CK[0] to CK[15], and the counting unit 105 latches a count value (an upper count value). The lower phase signals latched in the latch unit 1108 are encoded (binary-coded) as lower data of digital data by the detection circuit 1107 and the encoding circuit 1106, and the upper count value latched in the counting unit 1105 becomes upper data of the digital data. Accordingly, the digital data corresponding to the level of the analog signal can be obtained.

Hereinafter, the TDC type AD conversion circuit and the solid-state image pickup device using the same will be described. It is assumed that the signal (lower phase signals) held in the latch unit 1108 is a 16-bit data signal, and the count value (the upper count value) held in the counting unit 105 is an 8-bit data signal.

In encoding of the lower phase signals, it is preferable for multi-value comparison (detection as to whether a logic state of n (e.g., three) consecutive lower phase signals is a predetermined state) used for flash type ADC to be performed in time series while changing the lower phase signals of the comparison target. Specifically, a method of detecting that a logic state of three lower phase signals is a predetermined logic state, e.g., "001" (an L state, an L state and an H state) is performed in time series. This encoding method is applied to the TDC type AD conversion circuit using the asymmetry type oscillation circuit shown in FIG. 11.

For example, states of the lower phase signals CK[0] to CK[16] latched in the latch unit 1108 (combinations of respective logic states of the lower phase signals CK[0] to CK[16]) are all 16 states of state 0 to state 15, as shown in FIG. 12. When the counting unit 105 performs counting at a rising edge of the lower phase signal CK[15], the combinations of logic states of the lower phase signals CK[0] to CK[15] in each period obtained by dividing a period in which the counting unit 105 performs one counting (a period from the rising edge of the lower phase signal CK[15] to a next rising edge) in 16 are state 0 to state 15. State 0 to state 15 correspond to the encoding values 0 to 15 that are encoding results.

Hereinafter, content of a process of detecting that a logic state of three lower phase signals is a predetermined logic state (in this example, "001") will be described. FIG. 13 illustrates waveforms of the start pulse StartP and the output signals (the lower phase signals CK[0] to CK[16]) of the VCO 1100. In FIG. 13, the lower phase signals CK[0] to CK[16] shown in FIG. 12 are arranged to be a group of signals rising (changing from an L state to an H state) sequentially at predetermined time intervals. Specifically, the respective lower phase signals are arranged in the order of the lower phase signals CK[0], CK[2], CK[4], CK[6], CK[8], CK[10], CK[12], CK[14], CK[1], CK[3], CK[5], CK[7], CK[9], CK[11], CK[13] and CK[15].

When a predetermined time (corresponding to a delay time for two NAND circuits) elapses after the lower phase signal CK[0] changes from an L state to an H state, the lower phase signal CK[2] changes from an L state to an H state, as shown in FIG. 13. When a predetermined time (corresponding to a delay time for two NAND circuits) elapses after the lower phase signal CK[2] changes from an L state to an H state, the lower phase signal CK[4] changes from an L state to an H state. Then, similarly, the lower phase signals CK[6], CK[8], CK[10], CK[12], CK[14], CK[1], CK[3], CK[5], CK[7], CK[9], CK[11], CK[13] and CK[15] sequentially change from an L state to an H state.

In encoding of the lower phase signals, logic states of three consecutive lower phase signals in the signal group (signal sequence) in which the lower phase signals CK[0], CK[2], CK[4], CK[6], CK[8], CK[10], CK[12], CK[14], CK[1], CK[3], CK[5], CK[7], CK[9], CK[11], CK[13] and CK[15] latched in the latch unit 1108 are arranged in this order are detected to sequentially enter an L state, an L state, and an H state, respectively, and the encoding value is determined according to a position in which the logic state is detected.

FIG. 14 illustrates a correspondence relationship between the logic state of the lower phase signals latched in the latch unit 1108 and the encoding value according to the logic state of the lower phase signals. In FIG. 14, the lower phase signals are arranged in the same order as the lower phase signals in FIG. 13. Specifically, the order when each lower phase signal in FIG. 13 is sequentially seen from top to bottom is the same as the order when each lower phase signal in FIG. 14 is sequentially seen from right to left.

In FIG. 14, "1," "0" and "1/0" indicate logic states of the respective lower phase signals. "1," "0" and "1/0" correspond to an "H state," an "L state" and an "H state or L state," respectively. The logic states of the lower phase signals input to the latch unit 1108 change in time series, and the encoding value according to a timing at which the lower phase signals are latched in the latch unit 1108 may be obtained.

In FIG. 14, the encoding value is determined to correspond to a signal combination in which logic states of three consecutive signals are sequentially "0," "0" and "1." For example, when the logic states of the lower phase signals CK[2], CK[0] and CK[15] are "0," "0" and "1," respectively, the encoding value is "0," and when the logic states of the lower phase signals CK[4], CK[2] and CK[0] are "0," "0" and "1," respectively, the encoding value is "1." Similarly, when the logic states of the lower phase signals CK[0], CK[15], and CK[13] are "0," "0" and "1," respectively, the encoding value is "15."

However, logic states of three lower phase signals different from original ones may be detected to be "001" due to noise overlapping with the lower phase signals or the like, and a wrong encoding value may be obtained. For example, when the lower phase signals are latched in the latch unit 1108 at a timing at which a phase of the lower phase signal CK[0] advances relative to a phase of the lower phase signal CK[15] as shown in FIG. 15, the logic states of the lower phase signals latched in the latch unit 1108 are as shown in FIG. 16.

In this case, since the logic states of the lower phase signals CK[4], CK[2] and CK[0] latched in the latch unit 1108 are "0," "0" and "1," respectively, the encoding value is "1." However, originally, the logic state of the lower phase signal CK[0] should be "0," the logic states of the lower phase signals CK[0], CK[15] and CK[13] should be "0," "0" and "1," respectively, and the encoding value should be "15." In this case, an error of "14" that is a difference between "15" and "1" occurs in the lower data. In the TDC type AD conversion circuit to which the above encoding method has been applied and the solid-state image pickup device using the same, an error greatly exceeding "1" is likely to occur in the lower data.

SUMMARY

According to a first aspect of the present invention, an AD conversion circuit may include: a reference signal generation unit configured to generate a reference signal increasing or decreasing over time; a comparison unit configured to compare an analog signal that is a target of an AD conversion with the reference signal, the comparison unit being configured to terminate a comparison process at a timing at which the reference signal meets a predetermined condition for the analog signal; a clock generation unit that includes a delay circuit including a plurality of delay units connected to each other, the clock generation unit being configured to output a plurality of lower phase signals based on output signals of the delay circuit; a latch unit configured to latch the plurality of lower phase signals at a timing according to a termination of the comparison process; a counting unit including a counter circuit configured to perform counting by using a signal based on any one of the plurality of lower phase signals as a count clock so as to acquire an upper count value; and an encoding unit including a detection circuit and an encoding circuit, the detection circuit being configured to perform a first detection operation of detecting logic states of n lower phase signals (n is a natural number equal to or greater than 2) in a signal group that the plurality of lower phase signals, which has been latched in the latch unit, are arranged in the same order as those of the signal group when the plurality of lower phase signals, which are output from the clock generation unit during the comparison process, are arranged to be the signal group in which the lower phase signals rise or fall sequentially at predetermined time intervals according to on which of a rising edge and a falling edge of the count clock counting performed by the counter circuit is based, while selecting the n lower phase signals in a predetermined order, the detection circuit being configured to output a state detection signal when the logic state of the n lower phase signals is detected to be a predetermined logic state in the first detection operation, the encoding circuit being configured to perform encoding based on the state detection signal output from the detection circuit. The detection circuit may be configured to perform, at least once, a second detection operation of detecting the logic states of the n lower phase signals that are not n-consecutive in the first detection operation.

According to a second aspect of the present invention, in the AD conversion circuit according to the first aspect, n may be 3, and the detection circuit may be configured to perform, at least once, the second detection operation of detecting logic states of two lower phase signals that are consecutive in the signal group that the plurality of lower phase signals latched in the latch unit are arranged, and one lower phase signal not consecutive to either of the two lower phase signals.

According to a third aspect of the present invention, a solid-state image pickup device may include: an image capturing unit including a plurality of pixels arranged in a matrix form, each pixel including a photoelectric conversion element and outputting a pixel signal; and an AD conversion circuit according to the first aspect or the second aspect to which an analog signal according to the pixel signal is input. The comparison unit, the latch unit, the counting unit and the encoding unit included in the AD conversion circuit may be provided in each column or each plurality of columns of an array of pixels of the image capturing unit.

BRIEF DESCRIPTION OF THE DRAWINGS

The above features and advantages of the present invention will be more apparent from the following description of certain preferred embodiments taken in conjunction with the accompanying drawings, in which:

FIG. 14 is a reference diagram illustrating a correspondence relationship between logic states of lower phase signals latched in a latch unit and an encoding value according to the logic states of the lower phase signals;

FIG. 16 is a reference diagram illustrating a correspondence relationship between logic states of lower phase signals latched in a latch unit and an encoding value according to the logic states of the lower phase signals.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
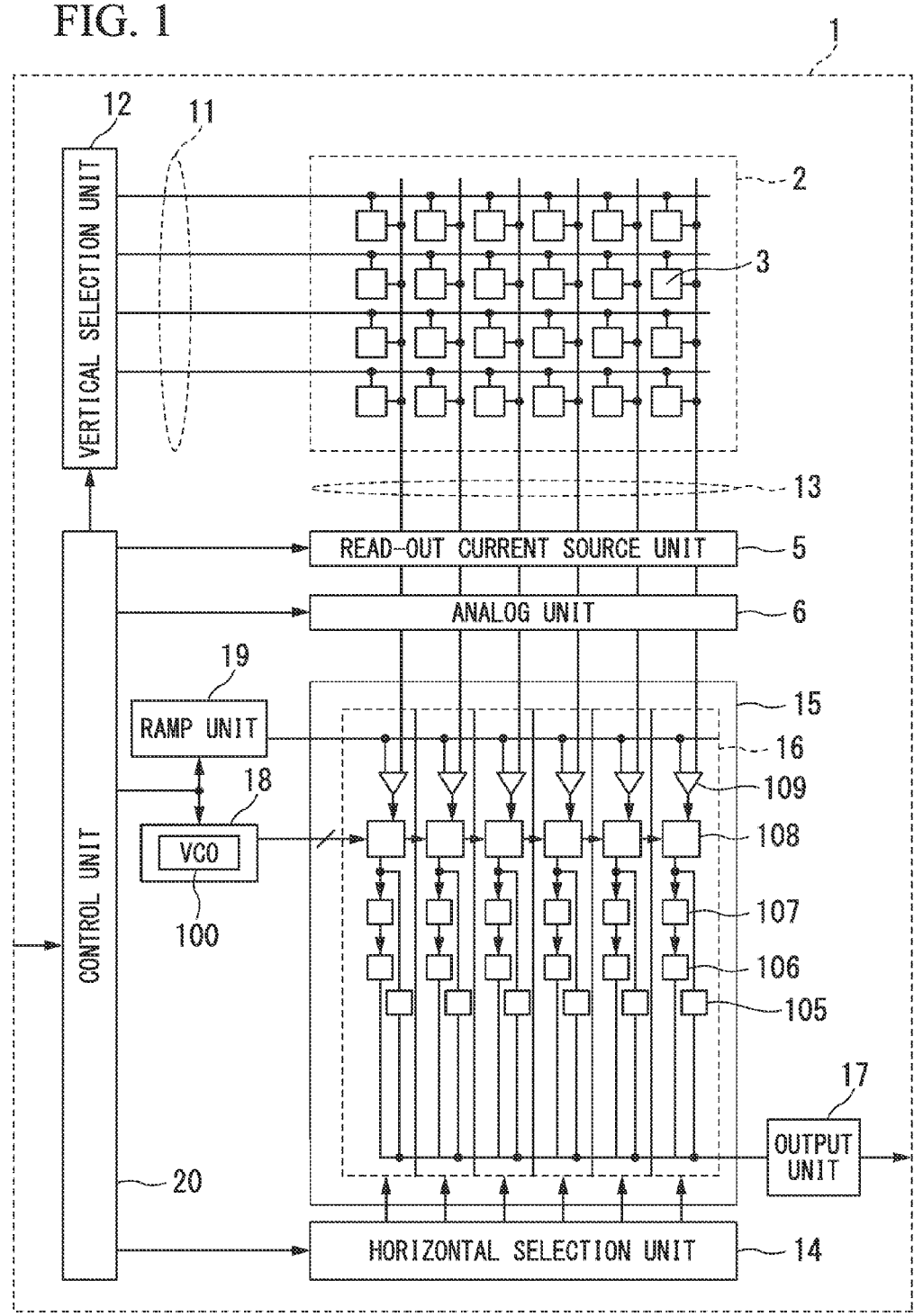
FIG. 1 is a block diagram illustrating a configuration of a solid-state image pickup device in accordance with a first preferred embodiment of the present invention.

First, a first preferred embodiment of the present invention will be described. FIG. 1 illustrates an example of a configuration of a solid-state image pickup device in accordance with the present preferred embodiment. The solid-state image pickup device 1 shown in FIG. 1 includes an image capturing unit 2, a vertical selection unit 12, a read-out current source unit 5, an analog unit 6, a clock generation unit 18, a ramp unit 19 (a reference signal generation unit), a column processing unit 15, a horizontal selection unit 14, an output unit 17, and a control unit 20.

In the image capturing unit 2, a plurality of unit pixels 3 that each generate and output a signal according to a magnitude of an incident electromagnetic wave are arranged in a matrix form. The vertical selection unit 12 selects each row of the image capturing unit 2. The read-out current source unit 5 reads a signal from the image capturing unit 2 as a voltage signal. The analog unit 6 performs analog processing on a pixel signal read from the image capturing unit 2. The clock generation unit 18 generates and outputs a clock signal at a predetermined frequency. The ramp unit 19 generates a reference signal (ramp wave) increasing or decreasing over time. The column processing unit 15 is connected to the ramp unit 19 via a reference signal line. The horizontal selection unit 14 reads AD-converted data to a horizontal signal line. The output unit 17 is connected to the horizontal signal line. The control unit 20 controls each unit.

While a case in which the image capturing unit 2 includes unit pixels 3 in 4 rows×6 columns is described in FIG. 1 for simplicity, tens of to tens of thousands of unit pixels 3 are actually arranged in each row or each column of the image capturing unit 2. Further, although not shown, the unit pixels 3 constituting the image capturing unit 2 include a photoelectric conversion element such as a photodiode/photogate/phototransistor, and a transistor circuit.

Hereinafter, a description of each unit will be given in greater detail. In the image capturing unit 2, the unit pixels 3 in 4 rows×6 columns are arranged two-dimensionally, and a row control line 11 is wired for each row in a pixel array of 4 rows×6 columns. Each one end of the row control line 11 is connected to an output end corresponding to a row of the vertical selection unit 12.

The vertical selection unit 12 includes a shift register or a decoder, and performs control of a row address or row scanning of the image capturing unit 2 via the row control line 11 in driving each unit pixel 3 of the image capturing unit 2.

Further, a vertical signal line 13 is wired for each column in the pixel array of the image capturing unit 2.

The read-out current source unit 5 includes, for example, an NMOS transistor. The vertical signal line 13 from the image capturing unit 2 is connected to a drain terminal of the NMOS transistor constituting the read-out current source unit 5, a desired voltage is appropriately applied to a gate terminal, and a source terminal is connected to GND. Accordingly, the signal from the unit pixel 3 is output as a voltage mode. Further, while the case in which the NMOS transistor is used as the current source is described, the present invention is not necessarily limited thereto.

While a detailed description of the analog unit 6 is omitted, the analog unit 6 performs a process of obtaining a difference between a signal level just after the pixel reset (a reset level) and a true signal level on the pixel signal of the voltage mode input via the vertical signal line 13 to thereby remove a noise component called FPN (=Fixed Pattern Noise), which is a fixed variation for each pixel, or a reset noise. Further, an AGC (=Auto Gain Control) circuit having a signal amplification function, or the like may be provided as necessary.

For example, the column processing unit 15 includes a column AD conversion unit 16 provided in each pixel column of the image capturing unit 2, i.e., each vertical signal line 13, and converts an analog pixel signal read from each unit pixel 3 of the image capturing unit 2 to each pixel column via the vertical signal line 13 into digital data. Further, in this example, while the configuration in which the column AD conversion units 16 are arranged in the pixel columns of the image capturing unit 2 in one-to-one correspondence, this is only an example and the present invention is not limited to this arrangement relationship. For example, a configuration in which one column AD conversion unit 16 is arranged for a plurality of pixels columns and used in time division among the plurality of pixels columns is also possible. The column processing unit 15 constitutes an analog-digital conversion means (an AD conversion circuit) that converts the analog pixel signal read from the unit pixel 3 of the selected pixel row of the image capturing unit 2 to digital pixel data, together with the ramp unit 19 and the clock generation unit 18, which will be described below.

The ramp unit 19 includes, for example, an integration circuit, and generates a so-called ramp wave whose level changes obliquely over time according to control by the control unit 20 and supplies the ramp wave to one of the input terminals of a comparison unit 109 via the reference signal line. Further, the ramp unit 19 is not limited to a ramp unit using the integration circuit, and a DAC circuit may be used. However, when a configuration in which the ramp wave is digitally generated using a DAC circuit is used, it is necessary to reduce the size of steps of the ramp wave or use the same configuration as this.

The horizontal selection unit 14 includes a shift register or a decoder and performs control of a column address and column scanning of the column AD conversion unit 16 of the column processing unit 15. According to control by this horizontal selection unit 14, the digital data after AD conversion in the column AD conversion units 16 is sequentially read to the horizontal signal line.

Figure 11:
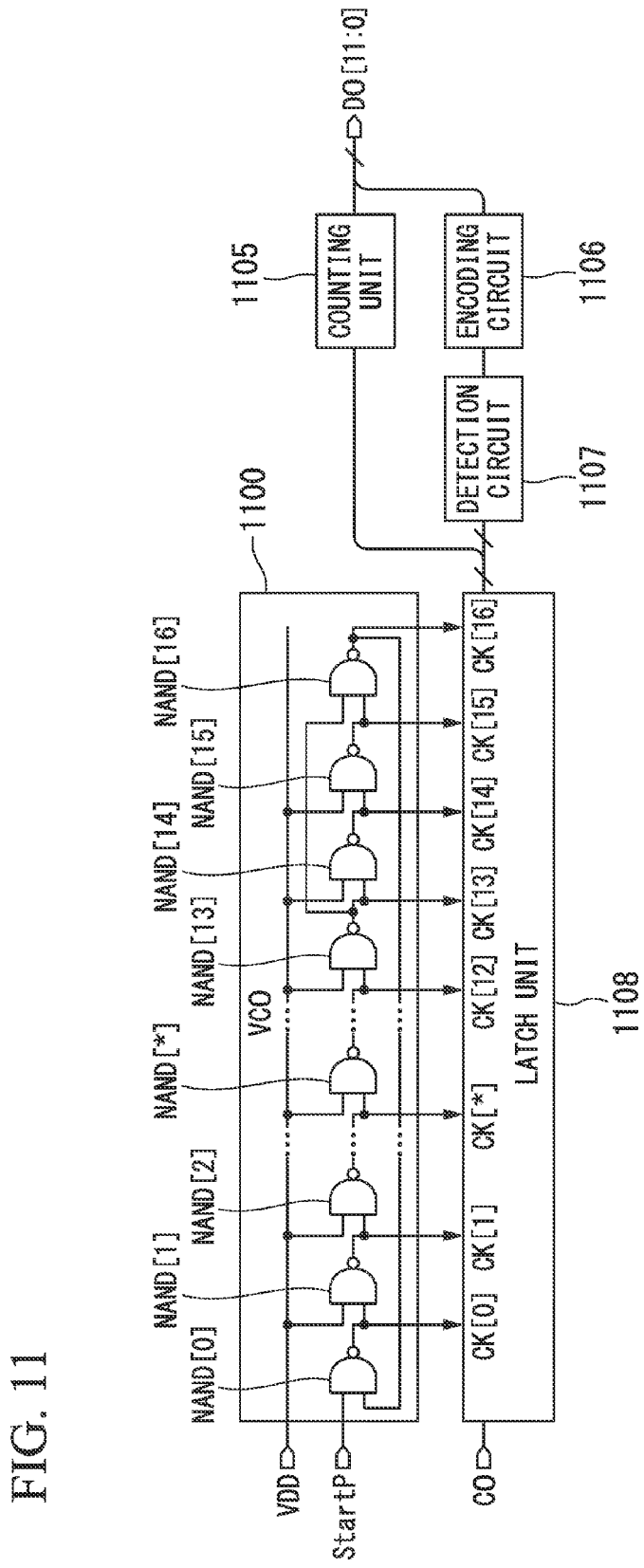
FIG. 11 is a block diagram illustrating a configuration of a portion of a conventional AD conversion circuit.
Figure 12:
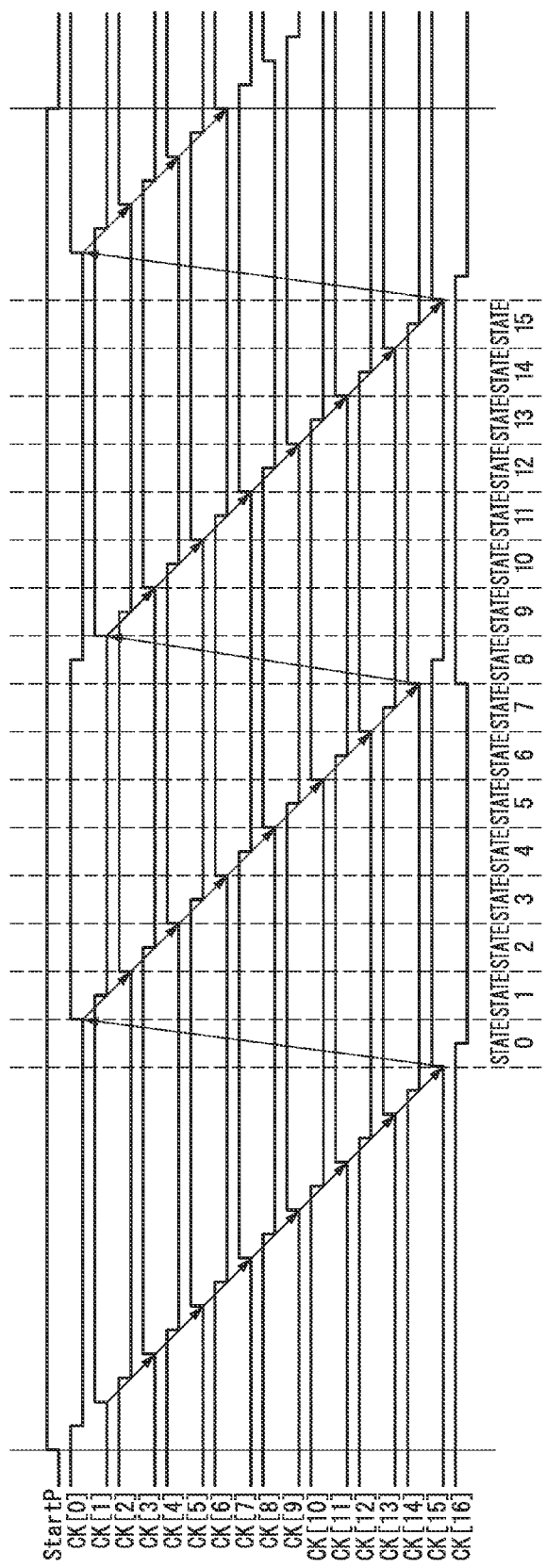
FIG. 12 is a timing chart illustrating waveforms of lower phase signals.

The clock generation unit 18 includes a VCO 100 that is a ring delay circuit in which a plurality of delay units (inverting elements) are connected in a ring form. The VCO 100 may be a so-called "asymmetry type oscillation circuit" including an odd number of delay units, like the VCO 1100, for example, as shown in FIG. 11. Alternatively, for the VCO 100, a so-called "fully differential oscillation circuit" which includes an even number (particularly, a power of 2) of delay units and in which an output of a last stage of a fully differential inversion circuit constituting the delay unit is fed back to the other input of a first stage may be used. A signal output by the delay unit constituting the VCO 100 constitutes a lower phase signal, which will be described below.

The output unit 17 outputs binary-coded digital data. Further, the output unit 17 may have, for example, a signal processing function such as black level adjustment, column variation correction, and color processing, as well as a buffering function. Furthermore, the output unit 17 may convert n-bit parallel digital data to serial data and output the serial data.

The control unit 20 includes a functional block of a TG (=Timing Generator) that supplies a clock or a pulse signal having a predetermined timing necessary for an operation of each unit such as the ramp unit 19, the clock generation unit 18, the vertical selection unit 12, the horizontal selection unit 14, and the output unit 17, and a functional block for performing communication with this TG.

Next, a configuration of the column AD conversion units 16 will be described. Each of the column AD conversion units 16 generates a pulse signal having a size (pulse width) in a time axis direction corresponding to a magnitude of the pixel signal by comparing the analog pixel signal read from each unit pixel 3 of the image capturing unit 2 via the vertical signal line 13 with the ramp wave for AD conversion given from the ramp unit 19. Also, the column AD conversion units 16 perform AD conversion by taking data corresponding to a period of a pulse width of the pulse signal as digital data according to the magnitude of the pixel signal.

Hereinafter, the configuration of the column AD conversion unit 16 will be described in detail. The column AD conversion unit 16 is provided in each column. In FIG. 1, six column AD conversion units 16 are provided. The column AD conversion unit 16 of each column has the same configuration. The column AD conversion unit 16 includes the comparison unit 109, a latch unit 108, a counting unit 105, a detection circuit 107, and an encoding circuit 106.

The comparison unit 109 compares a signal voltage according to the analog pixel signal output from the unit pixel 3 of the image capturing unit 2 via the vertical signal line 13 with the ramp voltage of the ramp wave supplied from the ramp unit 19 to thereby convert the magnitude of the pixel signal to information (the pulse width of the pulse signal) in the time axis direction. A comparison output CO of the comparison unit 109 is, for example, in a low level (L level) when the ramp voltage is greater than the signal voltage, and in a high level (H level) when the ramp voltage is equal to or smaller than the signal voltage.

The latch unit 108 includes a latch circuit that latches (holds/stores) lower phase signals CK[0] to CK[15] output from the VCO 100. The latch unit 108 directly outputs one (the lower phase signal CK[15] in this example) of the lower phase signals output from the VCO 100 to the counting unit 105 until the comparison output CO of the comparison unit 109 is inverted. Further, the latch unit 108 latches the lower phase signals CK[0] to CK[15] output from the VCO 100 at a timing at which the comparison output CO of the comparison unit 109 is inverted.

The counting unit 105 includes a counter circuit that performs counting using one lower phase signal (the lower phase signal CK[15] in this example) output via the latch unit 108 as a count clock to acquire a count value (an upper count value). Data of upper bits (upper data) constituting the digital data may be obtained as the counting unit 105 performs the counting.

Here, the lower phase signals latched in the latch unit 108 are, for example, 16-bit data. Further, the upper data signal constituted by the count value of the counting unit 105 is, for example, 8-bit data. Further, the 8 bits are one example and the data may have a number of bits (e.g., 10 bits) more than the 8 bits.

The detection circuit 107 detects a predetermined logic state by sequentially comparing three of the lower phase signals latched in the latch circuit of the latch unit 108 and outputs a detection result. The encoding circuit 106 performs encoding based on the detection result output from the detection circuit 107 and establishes an encoding value. Thus, the encoding of the lower phase signals is performed, and data of the lower bits (lower data) constituting the digital data may be obtained. A concrete encoding method will be described below.

Next, an operation in the present example will be described. Here, while a description of a concrete operation of the unit pixel 3 is omitted, a reset level and a signal level are output in the unit pixel 3, as is well known.

The AD conversion is performed as follows. For example, respective voltages of the ramp wave decreasing in a predetermined slope and the analog signal from the analog unit 6 are compared, the counting unit 105 counts the lower phase signal CK[15] output via the latch unit 108 during a period from a point in time at which this comparison process starts to a point in time at which the voltage of the analog signal and the voltage (the ramp voltage) of the ramp wave match, the detection circuit 107 detects the logic state of the lower phase signal latched in the latch unit 108, and the encoding circuit 106 encodes a detection result to obtain digital data corresponding to the magnitude of the analog signal.

First, after the pixel signal output from the unit pixel 3 of any pixel row to the vertical signal line 13 is stabilized, the control unit 20 supplies control data of ramp wave generation to the ramp unit 19. The ramp unit 19 receiving the control data outputs the ramp wave whose waveform changes, as a whole, in a ramp form in terms of time, as a comparison voltage given to one of the input terminals of the comparison unit 109. The comparison unit 109 compares this ramp wave with the analog signal from the analog unit 6. Meanwhile, the counting unit 105 performs counting using the lower phase signal CK[15] output from one latch circuit of the latch unit 108 as a count clock.

Further, it is preferable for an output start timing of the lower phase signal of the clock generation unit 18 and an output start timing of the ramp wave to be substantially the same, but the present invention is not limited thereto.

The comparison unit 109 compares the ramp wave given from the ramp unit 19 with the analog signal from the analog unit 6, and inverts a comparison output CO when voltages thereof substantially match. The latch circuit of the latch unit 108 enters a disable state at this timing, and the latch unit 108 latches the logic state of the lower phase signals CK[0] to CK[15] output from the clock generation unit 18. Further, the counting unit 105 latches a count value as the latch circuit of the latch unit 108 stops output of the lower phase signal CK[15]. When a predetermined amount of time elapses, the control unit 20 stops the supply of the control data to the ramp unit 19 and the output of the lower phase signals from the clock generation unit 18. Accordingly, the ramp unit 19 stops generation of the ramp wave.

Subsequently, encoding of the lower phase signals CK[0] to CK[15] held in the latch unit 108 is performed and an encoding value is latched in the encoding circuit 106. Furthermore, the encoding value latched in the encoding circuit 106 and the count value latched in the counting unit 105 are transferred to the output unit 17 by the horizontal selection unit 14 via the horizontal signal line.

Further, a reset level may be read from each unit pixel 3 of a selected row of the image capturing unit 2 in a first reading operation and subjected to AD conversion, a signal level may be read in a second reading operation and subjected to AD conversion, and then a CDS (=Correlated Double Sampling) process may be performed digitally to obtain the digital data according to the pixel signal. Further, the present invention is not necessarily limited thereto.

Figure 2:
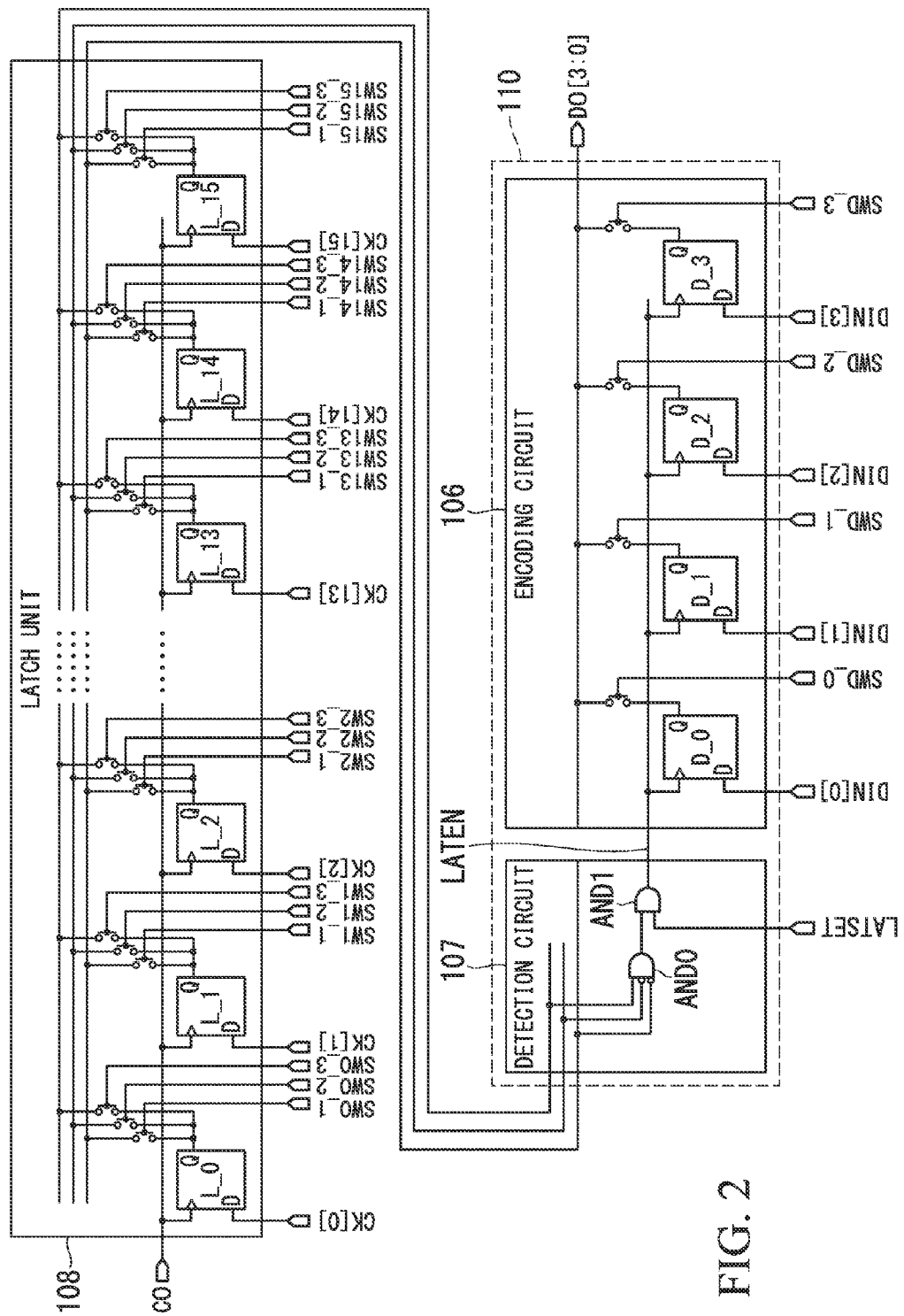
FIG. 2 is a circuit diagram illustrating a configuration of a latch unit, a detection circuit, and an encoding circuit constituting a column AD conversion unit included in a solid-state image pickup device in accordance with the first preferred embodiment of the present invention.

Next, the latch unit 108, the detection circuit 107, and the encoding circuit 106 will be described in detail. FIG. 2 illustrates a configuration of the latch unit 108, the detection circuit 107, and the encoding circuit 106.

The latch unit 108 includes latch circuits L_0 to L_15 that latch a logic state of the lower phase signals CK[0] to CK[15] at a point in time at which the comparison output CO from the comparison unit 109 is inverted. Control signals SW0_1 to SW15_1, SW0_2 to SW15_2, and SW0_3 to SW15_3 are signals controlling switches for outputting a desired lower phase signal from among the lower phase signals CK[0] to CK[15] latched in the latch circuits L_0 to L_15 to the detection circuit 107.

The detection circuit 107 includes AND circuits AND0 and AND1. The lower phase signal output from any one of the latch circuits L_0 to L_15 and signals obtained by inverting the lower phase signals output from any other two of the latch circuits L_0 to L_15 are input to the AND circuit AND0. The AND circuit AND0 performs an AND operation on the three input signals. An output signal of the AND circuit AND0 and a control signal LATSET are input to the AND circuit AND1. The AND circuit AND1 performs an AND operation on the two input signals, and outputs a result thereof as a detection result LATEN (a state detection signal) of a predetermined logic state.

The encoding circuit 106 includes latch circuits D_0 to D_3 for encoding. Encoding values DIN[0] to DIN[3] sequentially change according to a combination of the three lower phase signals sequentially compared by the detection circuit 107. Whenever the combination of the three lower phase signals input to the detection circuit 107 changes, the encoding values DIN[0] to DIN[3] input to the encoding circuit 106 change, and the encoding values DIN[0] to DIN[3] when a predetermined logic state is detected are held as an encoding result of the lower phase signals CK[0] to CK[15] and output as output signals DO[0] to DO[3]. The control signals SWD_0 to SWD_3 are signals controlling switches for outputting the encoding values from the latch circuits D_0 to D_3. The detection circuit 107 and the encoding circuit 106 constitute the encoding unit 110. Further, this is an example, and the present invention is not necessarily limited to this.

Figure 13:
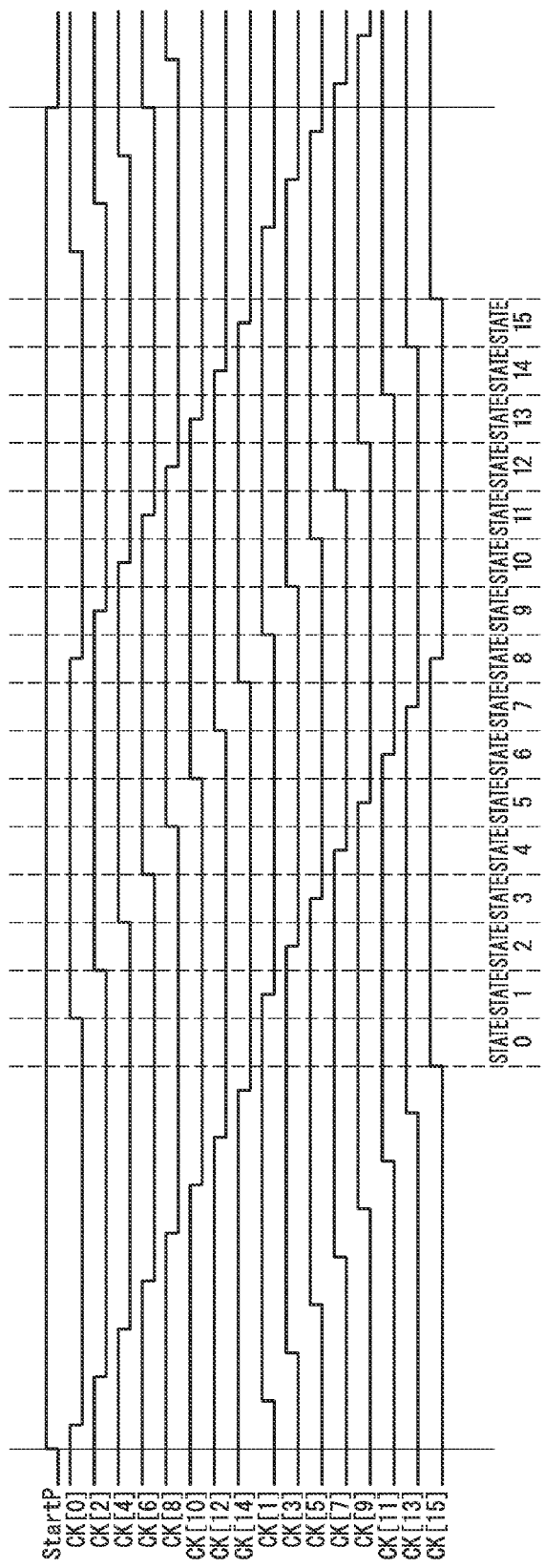
FIG. 13 is a timing chart illustrating waveforms of the lower phase signals.
Figure 15:
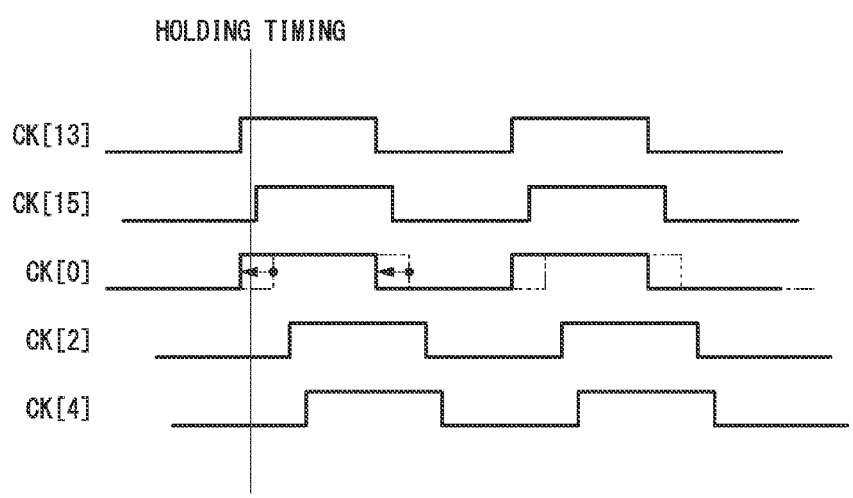
FIG. 15 is a timing chart illustrating waveforms of the lower phase signals.

Next, an operation of the detection circuit 107 and the encoding circuit 106 will be described. In the present preferred embodiment, the logic state of three lower phase signals in a signal group (signal sequence) in which the lower phase signals CK[0], CK[2], CK[4], CK[6], CK[8], CK[10], CK[12], CK[14], CK[1], CK[3], CK[5], CK[7], CK[9], CK[11], CK[13], and CK[15] latched in the latch unit 108 are arranged in this order, are detected to be an L state, an L state and an H state sequentially as shown in FIG. 13, and an encoding value is determined according to a position in which the logic state thereof is detected.

In an operation of detecting logic states of three lower phase signals (a first detection operation), an operation of detecting the logic states of "three consecutive" lower phase signals in the signal group (signal sequence) arranged as described above, and an operation of detecting logic states of "three nonconsecutive" lower phase signals (a second detection operation) are performed. In the operation of detecting logic states of "three nonconsecutive" lower phase signals, the logic states of the two consecutive lower phase signals and one lower phase signal that is not consecutive to either of the two lower phase signals are detected.

The lower phase signals are input from the three latch circuits selected from among the latch circuits L__0 to L__15, in which the lower phase signals CK[0] to CK[15] have been held, to the detection circuit 107 by the control signals SW0__1 to SW15__1, SW0__2 to SW15__2, and SW0__3 to SW15__3, and the logic states of the input lower phase signals are detected. The encoding values DIN[0] to DIN[3] when a result of the AND operation in the AND circuit AND0 is an H state are an encoding result. Hereinafter, a detailed operation will be described.

Figure 3:
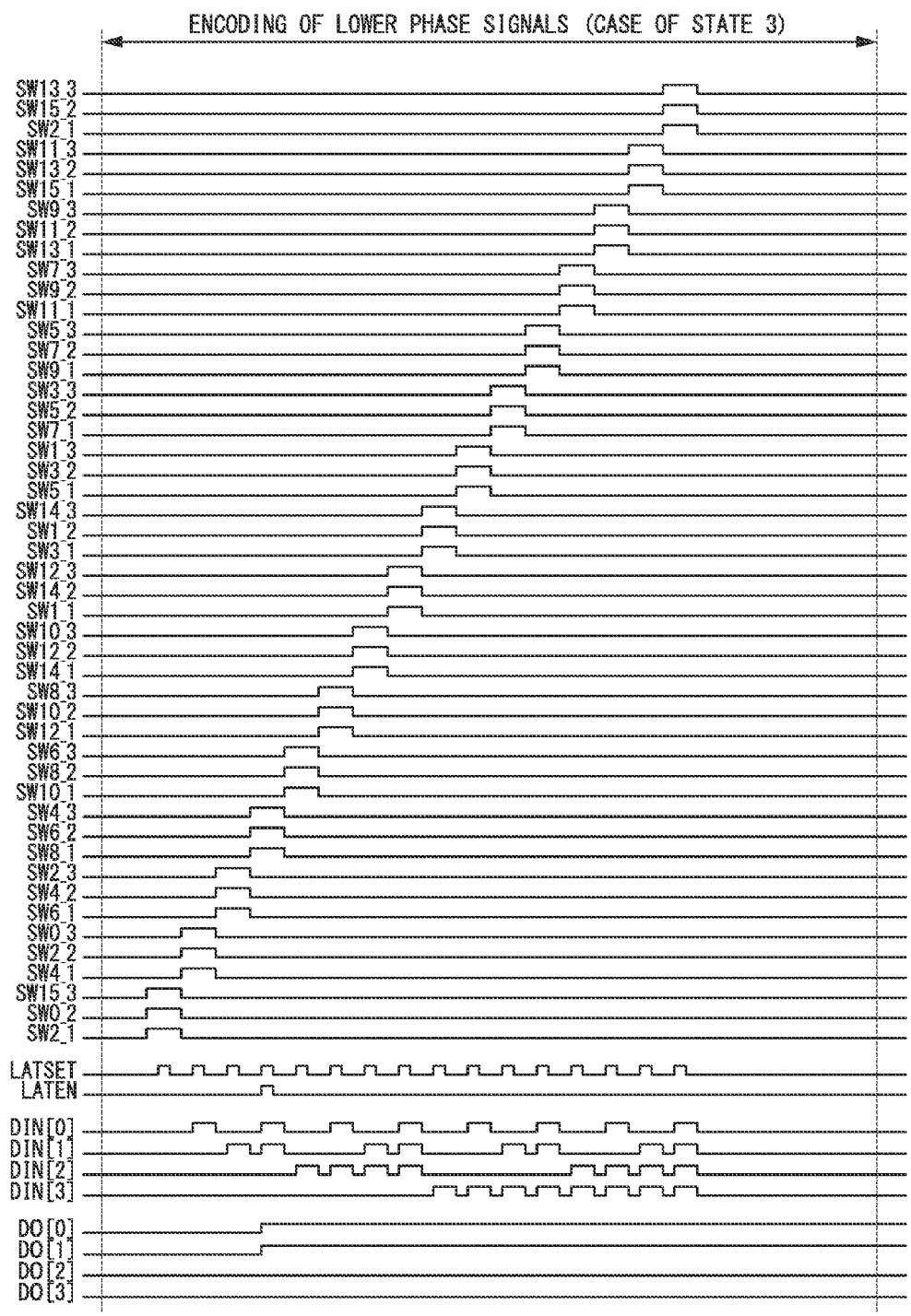
FIG. 3 is a timing chart illustrating an operation of the detection circuit and the encoding circuit constituting the column AD conversion unit included in the solid-state image pickup device in accordance with the first preferred embodiment of the present invention.

FIG. 3 illustrates a waveform of each signal according to an operation of the detection circuit 107 and the encoding circuit 106. Hereinafter, a case in which a state of the lower phase signals CK[0] to CK[15] latched in the latch unit 108 is "state 3" will be described by way of example. Among the following procedures (1) to (16), the operation of detecting logic states of "three nonconsecutive" lower phase signals is performed in procedure (16), and the operation of detecting logic states of "three consecutive" lower phase signals is performed in the other procedures.

Encoding Procedure
(Procedure 1)

First, when the control signals SW2__1, SW0__2 and SW15__3 enter an H state, a signal obtained by inverting the output signal (H state) of the latch circuit L__2 and a signal obtained by inverting the output signal (H state) of the latch circuit L__0 are input to the AND circuit AND0, and an output signal (H state) of the latch circuit L__15 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000. Further, "4'b" indicates that the output signal is a 4-bit binary number, and "0000" indicates the output of the latch circuits D__0 to D__3 in the encoding circuit 106.

(Procedure 2)

Subsequently, when the control signals SW4__1, SW2__2, and SW0__3 enter an H state, a signal obtained by inverting the output signal (H state) of the latch circuit L__4 and a signal obtained by inverting the output signal (H state) of the latch circuit L__2 are input to the AND circuit AND0, and an output signal (H state) of the latch circuit L__0 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 3)

Subsequently, when the control signals SW6__1, SW4__2 and SW2__3 enter an H state, a signal obtained by inverting the output signal (L state) of the latch circuit L__6 and a signal obtained by inverting the output signal (H state) of the latch circuit L__4 are input to the AND circuit AND0, and an output signal (H state) of the latch circuit L__2 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 4)

Subsequently, when the control signals SW8__1, SW6__2, and SW4__3 enter an H state, a signal obtained by inverting the output signal (L state) of the latch circuit L__8 and a signal obtained by inverting the output signal (L state) of the latch circuit L__6 are input to the AND circuit AND0, and an output signal (H state) of the latch circuit L__4 is input to the AND circuit AND0. Accordingly, the output signal of the AND circuit AND0 enters the H state. Subsequently, the control signal LATSET changes from an L state to an H state and then back to the L state. Accordingly, the detection result LATEN changes from an L state to an H state and then enters the L state, and an encoding value (DIN[3:0]=4'b0011) of this time is held in the encoding circuit 106. The output signal DO[3:0] of the encoding circuit 106 at this time point is 4'b0011.

(Procedure 5)

Subsequently, when the control signals SW10__1, SW8__2, and SW6__3 enter an H state, a signal obtained by inverting the output signal (L state) of the latch circuit L__10 and a signal obtained by inverting the output signal (L state) of the latch circuit L__8 are input to the AND circuit AND0, and an output signal (L state) of the latch circuit L__6 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 6)

Subsequently, when the control signals SW12__1, SW10__2 and SW8__3 enter an H state, a signal obtained by inverting the output signal (L state) of the latch circuit L__12 and a signal obtained by inverting the output signal (L state) of the latch circuit L__10 are input to the AND circuit AND0, and an output signal (L state) of the latch circuit L__8 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 7)

Subsequently, when the control signals SW14__1, SW12__2 and SW10__3 enter an H state, a signal obtained by inverting the output signal (L state) of the latch circuit L__14 and a signal obtained by inverting the output signal (L state) of the latch circuit L__12 are input to the AND circuit AND0, and an output signal (L state) of the latch circuit L__10 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 8)

Subsequently, when the control signals SW1_1, SW14_2 and SW12_3 enter an H state, a signal obtained by inverting the output signal (L state) of the latch circuit L_1 and a signal obtained by inverting the output signal (L state) of the latch circuit L_14 are input to the AND circuit AND0, and an output signal (L state) of the latch circuit L_12 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state.

Meanwhile, the detection result LATEN remains unchanged in the L state. The output signal DO[3:0] of the encoding circuit 106 at this time point is 4'b0011.

(Procedure 9)

Subsequently, when the control signals SW3_1, SW1_2, and SW14_3 enter an H state, a signal obtained by inverting the output signal (L state) of the latch circuit L_3 and a signal obtained by inverting the output signal (L state) of the latch circuit L_1 are input to the AND circuit AND0, and an output signal (L state) of the latch circuit L_14 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 10)

Subsequently, when the control signals SW5_1, SW3_2, and SW1_3 enter an H state, a signal obtained by inverting the output signal (an H state or an L state) of the latch circuit L_5 and a signal obtained by inverting the output signal (L state) of the latch circuit L_3 are input to the AND circuit AND0, and an output signal (L state) of the latch circuit L_1 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 11)

Subsequently, when the control signals SW7_1, SW5_2, and SW3_3 enter an H state, a signal obtained by inverting the output signal (H state) of the latch circuit L_7 and a signal obtained by inverting the output signal (an H state or an L state) of the latch circuit L_5 are input to the AND circuit AND0, and an output signal (L state) of the latch circuit L_3 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 12)

Subsequently, when the control signals SW9_1, SW7_2, and SW5_3 enter an H state, a signal obtained by inverting the output signal (H state) of the latch circuit L_9 and a signal obtained by inverting the output signal (H state) of the latch circuit L_7 are input to the AND circuit AND0, and an output signal (an H state or an L state) of the latch circuit L_5 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 13)

Subsequently, when the control signals SW11_1, SW9_2, and SW7_3 enter an H state, a signal obtained by inverting the output signal (H state) of the latch circuit L_11 and a signal obtained by inverting the output signal (H state) of the latch circuit L_9 are input to the AND circuit AND0, and an output signal (H state) of the latch circuit L_7 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 14)

Subsequently, when the control signals SW13_1, SW11_2, and SW9_3 enter an H state, a signal obtained by inverting the output signal (H state) of the latch circuit L_13 and a signal obtained by inverting the output signal (H state) of the latch circuit L_11 are input to the AND circuit AND0, and an output signal (H state) of the latch circuit L_9 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 15)

Subsequently, when the control signals SW15_1, SW13_2, and SW11_3 enter an H state, a signal obtained by inverting the output signal (H state) of the latch circuit L_15 and a signal obtained by inverting the output signal (H state) of the latch circuit L_13 are input to the AND circuit AND0, and an output signal (H state) of the latch circuit L_11 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

(Procedure 16)

Finally, when the control signals SW2_1, SW15_2, and SW13_3 rather than the control signals SW0_1, SW15_2 and SW13_3 enter an H state, a signal obtained by inverting the output signal (H state) of the latch circuit L_2 and a signal obtained by inverting the output signal (H state) of the latch circuit L_15 are input to the AND circuit AND0, and an output signal (H state) of the latch circuit L_13 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0011.

Using the method described above, the encoding value (DO[3:0]=4'b0011) corresponding to "state 3" is established.

Figure 4:
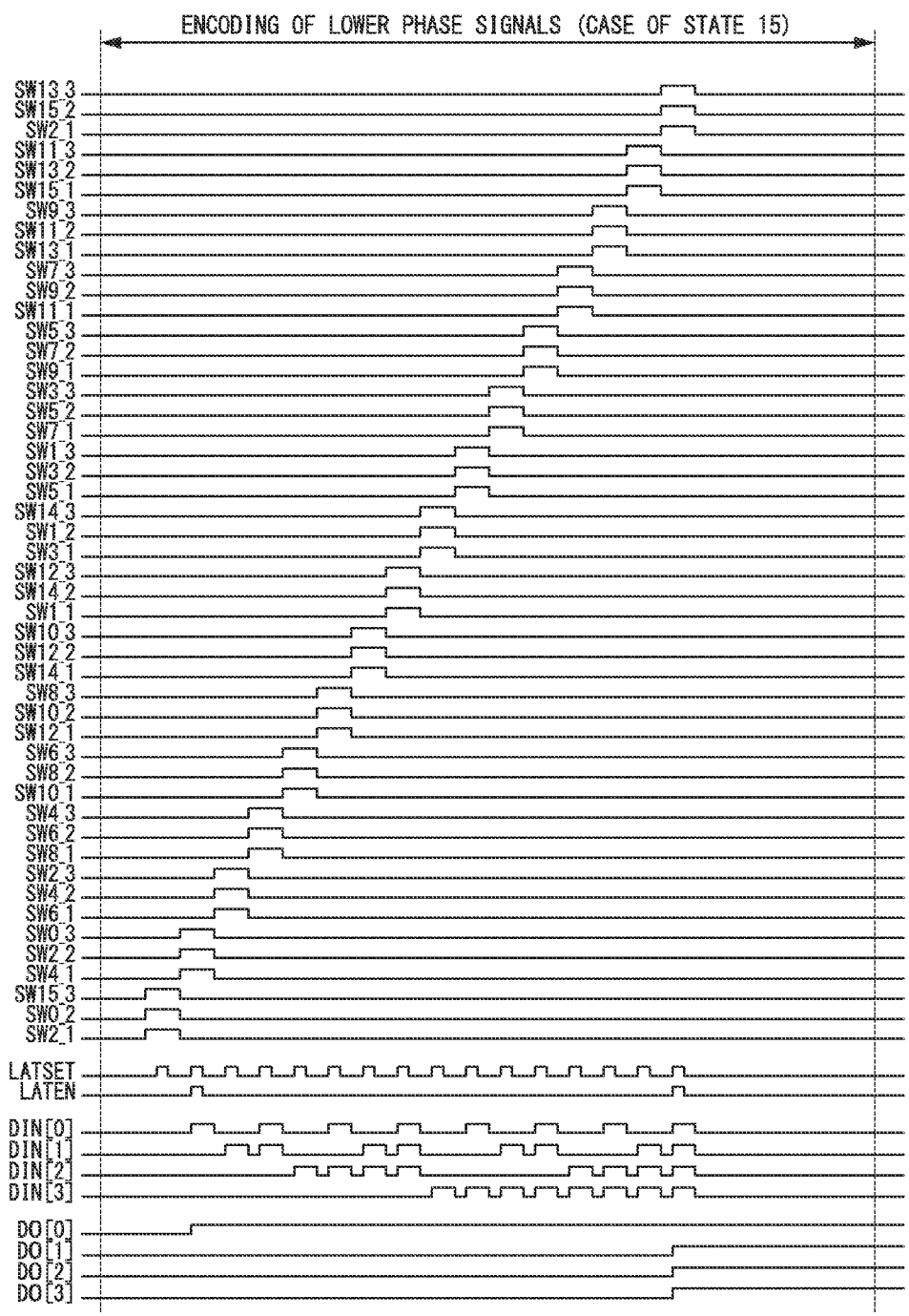
FIG. 4 is a timing chart illustrating an operation of the detection circuit and the encoding circuit constituting the column AD conversion unit included in the solid-state image pickup device in accordance with the first preferred embodiment of the present invention.

Next, a case in which a state of the lower phase signals CK[0] to CK[15] latched in the latch unit 108 is "state 15" and a phase of the lower phase signal CK[0] advances relative to a phase of the lower phase signal CK[15] due to influence of noise or the like will be described. FIG. 4 illustrates a waveform of each signal according to an operation of the detection circuit 107 and the encoding circuit 106. Hereinafter, it is assumed that the phase of the lower phase signal CK[0] advances relative to the phase of the lower phase signal CK[15] by a phase corresponding to a delay time for two delay units constituting the VCO 100. Among the following procedures (1) to (16), the operation of detecting logic states of "three nonconsecutive" lower phase signals is performed in procedure (16), and the operation of detecting logic states of "three consecutive" lower phase signals is performed in the other procedures.

Encoding Procedure (Procedure 1)

First, when the control signals SW2_1, SW0_2 and SW15_3 enter an H state, a signal obtained by inverting the output signal (L state) of the latch circuit L_2 and a signal obtained by inverting the output signal (H state) of the latch circuit L_0 are input to the AND circuit AND0, and an output signal (L state) of the latch circuit L_15 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 2)

Subsequently, when the control signals SW4_1, SW2_2, and SW0_3 enter an H state, a signal obtained by inverting the output signal (L state) of the latch circuit L_4 and a signal obtained by inverting the output signal (L state) of the latch circuit L_2 are input to the AND circuit AND0, and an output signal (H state) of the latch circuit L_0 is input to the AND circuit AND0. Accordingly, the output signal of the AND circuit AND0 enters the H state. Subsequently, the control signal LATSET changes from an L state to an H state and then to the L state. Accordingly, the detection result LATEN changes from an L state to an H state and then enters the L state, and an encoding value (DIN[3:0]=4'b0001) of this time is held in the encoding circuit 106. The output signal DO[3:0] of the encoding circuit 106 at this time point is 4'b0001. Since the lower phase signals CK[4], CK[2] and CK[0] latched in the latch unit 108 enter the L state, the L state, and the H state, respectively, as the phase of the lower phase signal CK[0] advances, the detection result LATEN enters the H state in procedure (2).

(Procedure 3)

Subsequently, when the control signals SW6_1, SW4_2 and SW2_3 enter an H state, a signal obtained by inverting the output signal (L state) of the latch circuit L_6 and a signal obtained by inverting the output signal (L state) of the latch circuit L_4 are input to the AND circuit AND0, and an output signal (L state) of the latch circuit L_2 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 4)

Subsequently, when the control signals SW8_1, SW6_2, and SW4_3 enter an H state, a signal obtained by inverting the output signal (L state) of the latch circuit L_8 and a signal obtained by inverting the output signal (L state) of the latch circuit L_6 are input to the AND circuit AND0, and an output signal (L state) of the latch circuit L_4 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 5)

Subsequently, when the control signals SW10_1, SW8_2, and SW6_3 enter an H state, a signal obtained by inverting the output signal (L state) of the latch circuit L_10 and a signal obtained by inverting the output signal (L state) of the latch circuit L_8 are input to the AND circuit AND0, and an output signal (L state) of the latch circuit L_6 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 6)

Subsequently, when the control signals SW12_1, SW10_2, and SW8_3 enter an H state, a signal obtained by inverting the output signal (L state) of the latch circuit L_12 and a signal obtained by inverting the output signal (L state) of the latch circuit L_10 are input to the AND circuit AND0, and an output signal (L state) of the latch circuit L_8 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 7)

Subsequently, when the control signals SW14_1, SW12_2, SW10_3 enter an H state, a signal obtained by inverting the output signal (an H state or an L state) of the latch circuit L_14 and a signal obtained by inverting the output signal (L state) of the latch circuit L_12 are input to the AND circuit AND0, and an output signal (L state) of the latch circuit L_10 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 8)

Subsequently, when the control signals SW1_1, SW14_2 and SW12_3 enter an H state, a signal obtained by inverting the output signal (H state) of the latch circuit L_1 and a signal obtained by inverting the output signal (an H state or an L state) of the latch circuit L_14 are input to the AND circuit AND0, and an output signal (L state) of the latch circuit L_12 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 9)

Subsequently, when the control signals SW3_1, SW1_2, and SW14_3 enter an H state, a signal obtained by inverting the output signal (H state) of the latch circuit L_3 and a signal obtained by inverting the output signal (H state) of the latch circuit L_1 are input to the AND circuit AND0, and an output signal (an H state or an L state) of the latch circuit L_14 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 10)

Subsequently, when the control signals SW5_1, SW3_2, and SW1_3 enter an H state, a signal obtained by inverting the output signal (H state) of the latch circuit L_5 and a signal obtained by inverting the output signal (H state) of the latch circuit L_3 are input to the AND circuit AND0, and an output signal (H state) of the latch circuit L_1 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 11)

Subsequently, when the control signals SW7_1, SW5_2, and SW3_3 enter an H state, a signal obtained by inverting the output signal (H state) of the latch circuit L_7 and a signal obtained by inverting the output signal (H state) of the latch circuit L_5 are input to the AND circuit AND0, and an output signal (H state) of the latch circuit L_3 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 12)

Subsequently, when the control signals SW9_1, SW7_2, and SW5_3 enter an H state, a signal obtained by inverting the output signal (H state) of the latch circuit L_9 and a signal obtained by inverting the output signal (H state) of the latch circuit L_7 are input to the AND circuit AND0, and the output signal (H state) of the latch circuit L_5 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 13)

Subsequently, when the control signals SW11_1, SW9_2, and SW7_3 enter an H state, a signal obtained by inverting the output signal (H state) of the latch circuit L_11 and a signal obtained by inverting the output signal (H state) of the latch circuit L_9 are input to the AND circuit AND0, and an output signal (H state) of the latch circuit L_7 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 14)

Subsequently, when the control signals SW13_1, SW11_2, and SW9_3 enter an H state, a signal obtained by inverting the output signal (H state) of the latch circuit L_13 and a signal obtained by inverting the output signal (H state) of the latch circuit L_11 are input to the AND circuit AND0, and an output signal (H state) of the latch circuit L_9 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 15)

Subsequently, when the control signals SW15_1, SW13_2, and SW11_3 enter an H state, a signal obtained by inverting the output signal (L state) of the latch circuit L_15 and a signal obtained by inverting the output signal (H state) of the latch circuit L_13 are input to the AND circuit AND0, and an output signal (H state) of the latch circuit L_11 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0001.

(Procedure 16)

Finally, when the control signals SW2_1, SW15_2, and SW13_3 rather than the control signals SW0_1, SW15_2 and SW13_3 enter an H state, a signal obtained by inverting the output signal (L state) of the latch circuit L_2 and a signal obtained by inverting the output signal (L state) of the latch circuit L_15 are input to the AND circuit AND0, and an output signal (H state) of the latch circuit L_13 is input to the AND circuit AND0. Accordingly, the output signal of the AND circuit AND0 enters the H state. Subsequently, the control signal LATSET changes from an L state to an H state and then back to the L state.

Accordingly, the detection result LATEN changes from an L state to an H state and then enters the L state, and an encoding value (DIN[3:0]=4'b1111) of this time is held in the encoding circuit 106 again. The output signal DO[3:0] of the encoding circuit 106 at this time point is 4'b1111.

Using the method described above, the encoding value (DO[3:0]=4'b1111) corresponding to "state 15" is established. If encoding is performed using a conventional encoding method (a method of detecting that logic states of the "three consecutive" lower phase signals are a predetermined logic state "001"), the lower phase signals CK[0], CK[15], CK[13] latched in the latch unit 108 are in the H state, the L state, and the H state, respectively, and accordingly, the detection result LATEN remains unchanged in the L state in procedure (16). Therefore, the output signal DO[3:0] of the encoding circuit 106 remains as 4'b0001, and an error of "14" that is a difference between "15" and "1" occurs in the lower data. In contrast, in the present preferred embodiment, even when the phase of the lower phase signal CK[0] advances relative to the phase of the lower phase signal CK[15], an error does not occur in the encoding when the state of the lower phase signals CK[0] to CK[15] is "state 15."

When an error occurs in procedure (16) in the encoding when the state of the lower phase signals CK[0] to CK[15] is "state 15," an error greatly exceeding "1" occurs in the lower data, as described above. Therefore, in procedure (16), the operation of detecting the logic states of "three nonconsecutive" lower phase signals instead of the "three consecutive" lower phase signals is performed.

Figure 5:
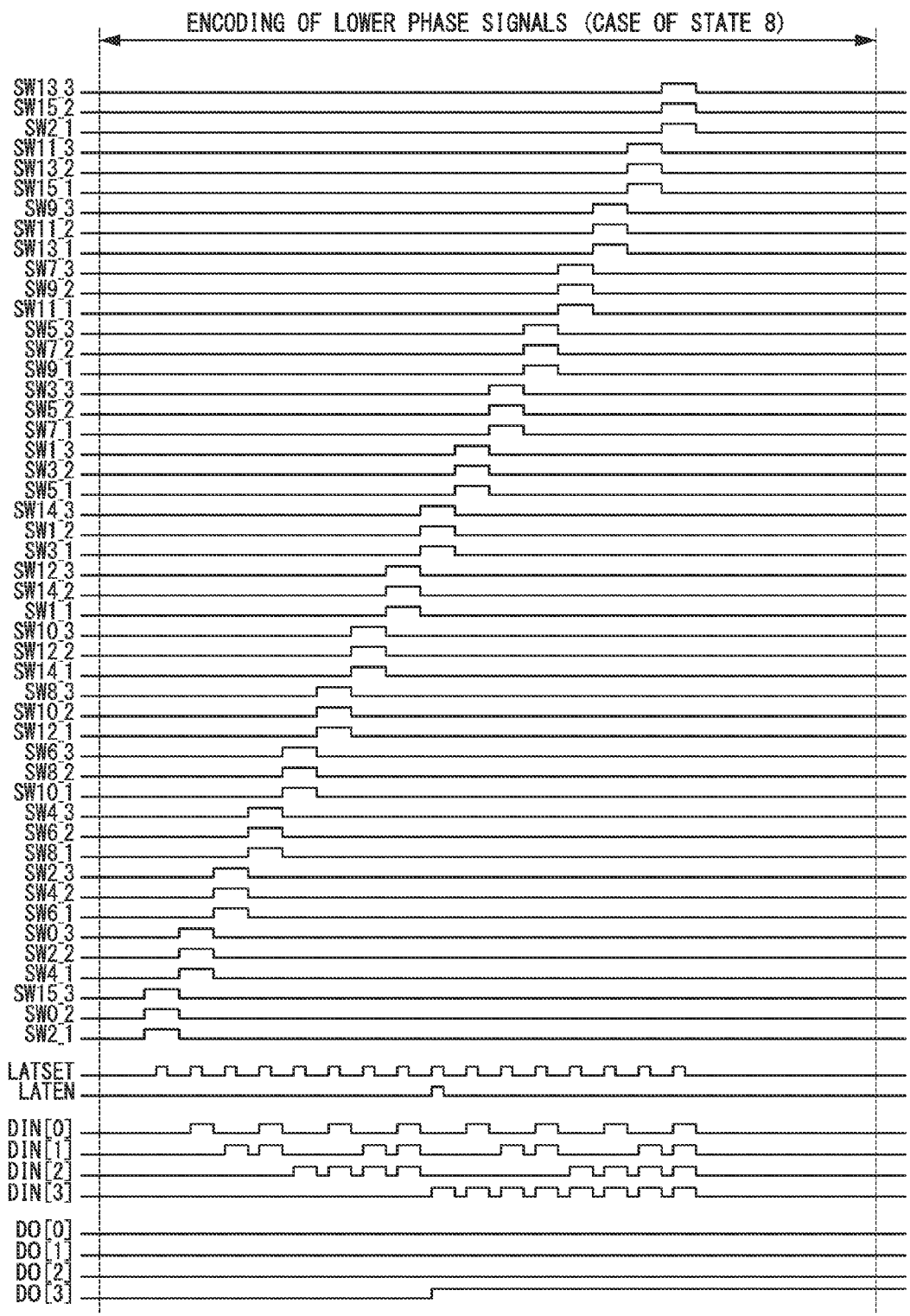
FIG. 5 is a timing chart illustrating an operation of the detection circuit and the encoding circuit constituting the column AD conversion unit included in the solid-state image pickup device in accordance with the first preferred embodiment of the present invention.

Next, a case in which the state of the lower phase signals CK[0] to CK[15] latched in the latch unit 108 is "state 8," the phase of the lower phase signal CK[0] advances relative to the phase of the lower phase signal CK[15] due to influence of noise or the like, and the phase of the lower phase signal CK[13] lags relative to the phase of the lower phase signal CK[15] will be described. FIG. 5 illustrates a waveform of each signal according to an operation of the detection circuit 107 and the encoding circuit 106. Hereinafter, it is assumed that the phase of the lower phase signal CK[0] advances relative to the phase of the lower phase signal CK[15] by a phase corresponding to a delay time for two delay units constituting the VCO 100, and the phase of the lower phase signal CK[13] lags relative to the phase of the lower phase signal CK[15] by the phase corresponding to the delay time for two delay units constituting the VCO 100. Among following procedures (1) to (16), the operation of detecting logic states of "three nonconsecutive" lower phase signals is performed in procedure (16), and the operation of detecting logic states of "three consecutive" lower phase signals is performed in the other procedures.

Encoding Procedure (Procedure 1)

First, when the control signals SW2_1, SW0_2 and SW15_3 enter an H state, a signal obtained by inverting the output signal (H state) of the latch circuit L_2 and a signal obtained by inverting the output signal (L state) of the latch circuit L_0 are input to the AND circuit AND0, and an output signal (an H state or an L state) of the latch circuit L_15 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 2)

Subsequently, when the control signals SW4_1, SW2_2, and SW0_3 enter an H state, a signal obtained by inverting the output signal (H state) of the latch circuit L_4 and a signal obtained by inverting the output signal (H state) of the latch circuit L_2 are input to the AND circuit AND0, and an output signal (L state) of the latch circuit L_0 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 3)

Subsequently, when the control signals SW6_1, SW4_2 and SW2_3 enter an H state, a signal obtained by inverting the output signal (H state) of the latch circuit L_6 and a signal obtained by inverting the output signal (H state) of the latch circuit L_4 are input to the AND circuit AND0, and an output signal (H state) of the latch circuit L_2 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 4)

Subsequently, when the control signals SW8_1, SW6_2, and SW4_3 enter an H state, a signal obtained by inverting the output signal (H state) of the latch circuit L_8 and a signal obtained by inverting the output signal (H state) of the latch circuit L_6 are input to the AND circuit AND0, and an output signal (H state) of the latch circuit L_4 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 5)

Subsequently, when the control signals SW10_1, SW8_2, and SW6_3 enter an H state, a signal obtained by inverting the output signal (H state) of the latch circuit L_10 and a signal obtained by inverting the output signal (H state) of the latch circuit L_8 are input to the AND circuit AND0, and an output signal (H state) of the latch circuit L_6 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 6)

Subsequently, when the control signals SW12_1, SW10_2, and SW8_3 enter an H state, a signal obtained by inverting the output signal (H state) of the latch circuit L_12 and a signal obtained by inverting the output signal (H state) of the latch circuit L_10 are input to the AND circuit AND0, and an output signal (H state) of the latch circuit L_8 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 7)

Subsequently, when the control signals SW14_1, SW12_2, SW10_3 enter an H state, a signal obtained by inverting the output signal (H state) of the latch circuit L_14 and a signal obtained by inverting the output signal (H state) of the latch circuit L_12 are input to the AND circuit AND0, and an output signal (H state) of the latch circuit L_10 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 8)

Subsequently, when the control signals SW1_1, SW14_2 and SW12_3 enter an H state, a signal obtained by inverting the output signal (L state) of the latch circuit L_1 and a signal obtained by inverting the output signal (H state) of the latch circuit L_14 are input to the AND circuit AND0, and an output signal (H state) of the latch circuit L_12 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 9)

Subsequently, when the control signals SW3_1, SW1_2, and SW14_3 enter an H state, a signal obtained by inverting the output signal (L state) of the latch circuit L_3 and a signal obtained by inverting the output signal (L state) of the latch circuit L_1 are input to the AND circuit AND0, and an output signal (H state) of the latch circuit L_14 is input to the AND circuit AND0. Accordingly, the output signal of the AND circuit AND0 enters the H state. Subsequently, the control signal LATSET changes from an L state to an H state and then back to the L state. Accordingly, the detection result LATEN changes from an L state to an H state and then enters the L state, and the encoding value (DIN[3:0]=4'b1000) of this time is held in the encoding circuit 106. The output signal DO[3:0] of the encoding circuit 106 at this time point is 4'b1000.

(Procedure 10)

Subsequently, when the control signals SW5_1, SW3_2, and SW1_3 enter an H state, a signal obtained by inverting the output signal (L state) of the latch circuit L_5 and a signal obtained by inverting the output signal (L state) of the latch circuit L_3 are input to the AND circuit AND0, and an output signal (L state) of the latch circuit L_1 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 11)

Subsequently, when the control signals SW7_1, SW5_2, and SW3_3 enter an H state, a signal obtained by inverting the output signal (L state) of the latch circuit L_7 and a signal obtained by inverting the output signal (L state) of the latch circuit L_5 are input to the AND circuit AND0, and an output signal (L state) of the latch circuit L_3 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 12)

Subsequently, when the control signals SW9_1, SW7_2, and SW5_3 enter an H state, a signal obtained by inverting the output signal (L state) of the latch circuit L_9 and a signal obtained by inverting the output signal (L state) of the latch circuit L_7 are input to the AND circuit AND0, and an output signal (L state) of the latch circuit L_5 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 13)

Subsequently, when the control signals SW11_1, SW9_2, and SW7_3 enter an H state, a signal obtained by inverting the output signal (L state) of the latch circuit L_11 and a signal obtained by inverting the output signal (L state) of the latch circuit L_9 are input to the AND circuit AND0, and an output signal (L state) of the latch circuit L_7 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 14)

Subsequently, when the control signals SW13_1, SW11_2, and SW9_3 enter an H state, a signal obtained by inverting the output signal (H state) of the latch circuit L_13 and a signal obtained by inverting the output signal (L state) of the latch circuit L_11 are input to the AND circuit AND0, and an output signal (L state) of the latch circuit L_9 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 15)

Subsequently, when the control signals SW15_1, SW13_2, and SW11_3 enter an H state, a signal obtained by inverting the output signal (an H state or an L state) of the latch circuit L_15 and a signal obtained by inverting the output signal (H state) of the latch circuit L_13 are input to the AND circuit AND0, and an output signal (L state) of the latch circuit L_11 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 16)

Finally, when the control signals SW2_1, SW15_2, and SW13_3 rather than the control signals SW0_1, SW15_2 and SW13_3 enter an H state, a signal obtained by inverting the output signal (H state) of the latch circuit L_2 and a signal obtained by inverting the output signal (an H state or an L state) of the latch circuit L_15 are input to the AND circuit AND0, and an output signal (L state) of the latch circuit L_13 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

Using the method described above, the encoding value (DO[3:0]=4'b1000) corresponding to "state 8" is established. When the phase of the lower phase signal CK[0] advances relative to the phase of the lower phase signal CK[15] and the phase of the lower phase signal CK[13] lags relative to the phase of the lower phase signal CK[15], the lower phase signal CK[0] latched in the latch unit 108 may enter the L state, the lower phase signal CK[15] may enter the L state, and the lower phase signal CK[13] may enter the H state. In this state, if encoding is performed using a conventional encoding method (a method of detecting that a logic state of the "three consecutive" lower phase signals is predetermined logic state "001"), the detection result LATEN enters the H state since the lower phase signals CK[0], CK[15] and CK[13] latched in the latch unit 108 are the L state, the L state, and the H state, respectively, in procedure (16). Therefore, the output signal DO[3:0] of the encoding circuit 106 is 4'b1111, and an error of "7" that is a difference between "15" and "8" occurs in the lower data. In contrast, in the present preferred embodiment, even when the phase of the lower phase signal CK[0] advances relative to the phase of the lower phase signal CK[15] and the phase of the lower phase signal CK[13] lags relative to the phase of the lower phase signal CK[15], an error does not occur in the encoding when the state of the lower phase signals CK[0] to CK[15] is "state 8."

As described above, according to the present preferred embodiment, in the operation of detecting the logic state of the three lower phase signals, it is possible to reduce the occurrence of the error in the encoding of the lower phase signals by performing the operation of detecting logic states of "three nonconsecutive" lower phase signals. Therefore, it is possible to perform high precision AD conversion in the TDC type AD conversion circuit and the solid-state image pickup device using the same.

Second Preferred Embodiment

Figure 6:
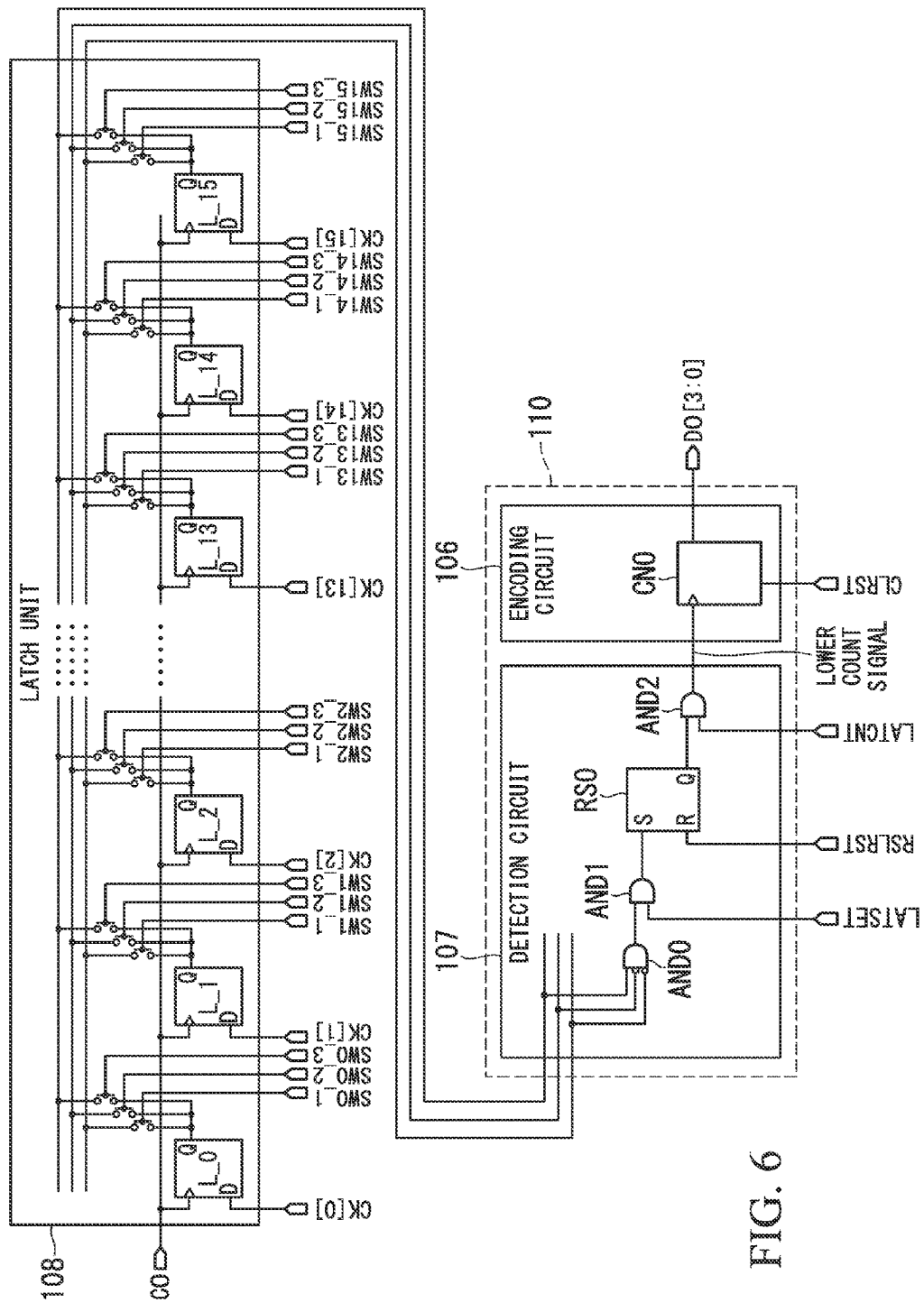
FIG. 6 is a circuit diagram illustrating a configuration of a latch unit, a detection circuit, and an encoding circuit constituting a column AD conversion unit included in a solid-state image pickup device in accordance with a second preferred embodiment of the present invention.

Next, a second preferred embodiment of the present invention will be described. FIG. 6 illustrates a configuration of the latch unit 108, the detection circuit 107, and the encoding circuit 106 of the present preferred embodiment. Since the configuration of the latch unit 108 is similar to that in the first preferred embodiment, a description thereof will be omitted.

The detection circuit 107 includes AND circuits AND0, AND1 and AND2, and an RS latch RS0. Since the AND circuits AND0 and AND1 are similar to those in the first preferred embodiment, a description thereof will be omitted. An output signal of the AND circuit AND1 and a control signal RSLRST are input to the RS latch RS0. After the RS latch RS0 is reset by the control signal RSLRST, an output signal of the RS latch RS0 changes from an L state to an H state when the output signal of the AND circuit AND1 changes from an L state to an H state, and then the RS latch RS0 keeps the output signal in the H state regardless of the state of the output signal of the AND circuit AND1 until the RS latch RS0 is reset by the control signal RSLRST. The output signal of the RS latch RS0 and a count signal LATCNT are input to the AND circuit AND2. The AND circuit AND2 performs an AND operation on the two input signals to generate a lower count signal (a state detection signal).

The encoding circuit 106 includes a counter circuit CN0. The lower count signal from the AND circuit AND2 is input to the counter circuit CN0. The counter circuit CN0 performs counting using the lower count signal as a count clock to establish an encoding value. Further, this is an example, and the present invention is not necessarily limited to this.

Next, an operation of the detection circuit 107 and the encoding circuit 106 will be described. In the present preferred embodiment, logic states of three lower phase signals in a signal group (signal sequence) in which lower phase signals CK[0], CK[2], CK[4], CK[6], CK[8], CK[10], CK[12], CK[14], CK[1], CK[3], CK[5], CK[7], CK[9], CK[11], CK[13] and CK[15] latched in the latch unit 108 are arranged in this order as shown in FIG. 13 are detected to be the L state, the L state, and the H state sequentially, and the encoding value is determined according to a position where the logic state is detected.

In an operation of detecting logic states of three lower phase signals (a first detection operation), an operation of detecting the logic states of "three consecutive" lower phase signals in the signal group (signal sequence) arranged as described above, and an operation of detecting logic states of "three nonconsecutive" lower phase signals (a second detection operation) are performed. In the operation of detecting logic states of "three nonconsecutive" lower phase signals, the logic states of the two consecutive lower phase signals and one lower phase signal not consecutive to either of the two lower phase signals are detected.

The lower phase signals are input from three latch circuits selected from among the latch circuits L_0 to L_15 in which the lower phase signals CK[0] to CK[15] have been held, to the detection circuit 107 by control signals SW0_1 to SW15_1, SW0_2 to SW15_2, and SW0_3 to SW15_3, and the logic states of the input lower phase signals are detected. At a timing at which the result of the AND operation in the AND circuit AND0 is an H state, generation of the lower count signal consisting of pulses, the number of which depends on the states of the lower phase signals CK[0] to CK[15], starts and the counter circuit CN0 starts counting of the lower count signal. Count values DO[0] to DO[3] of the counter circuit CN0 when the counting ends are the encoding result. Hereinafter, a detailed operation will be described.

Figure 7:
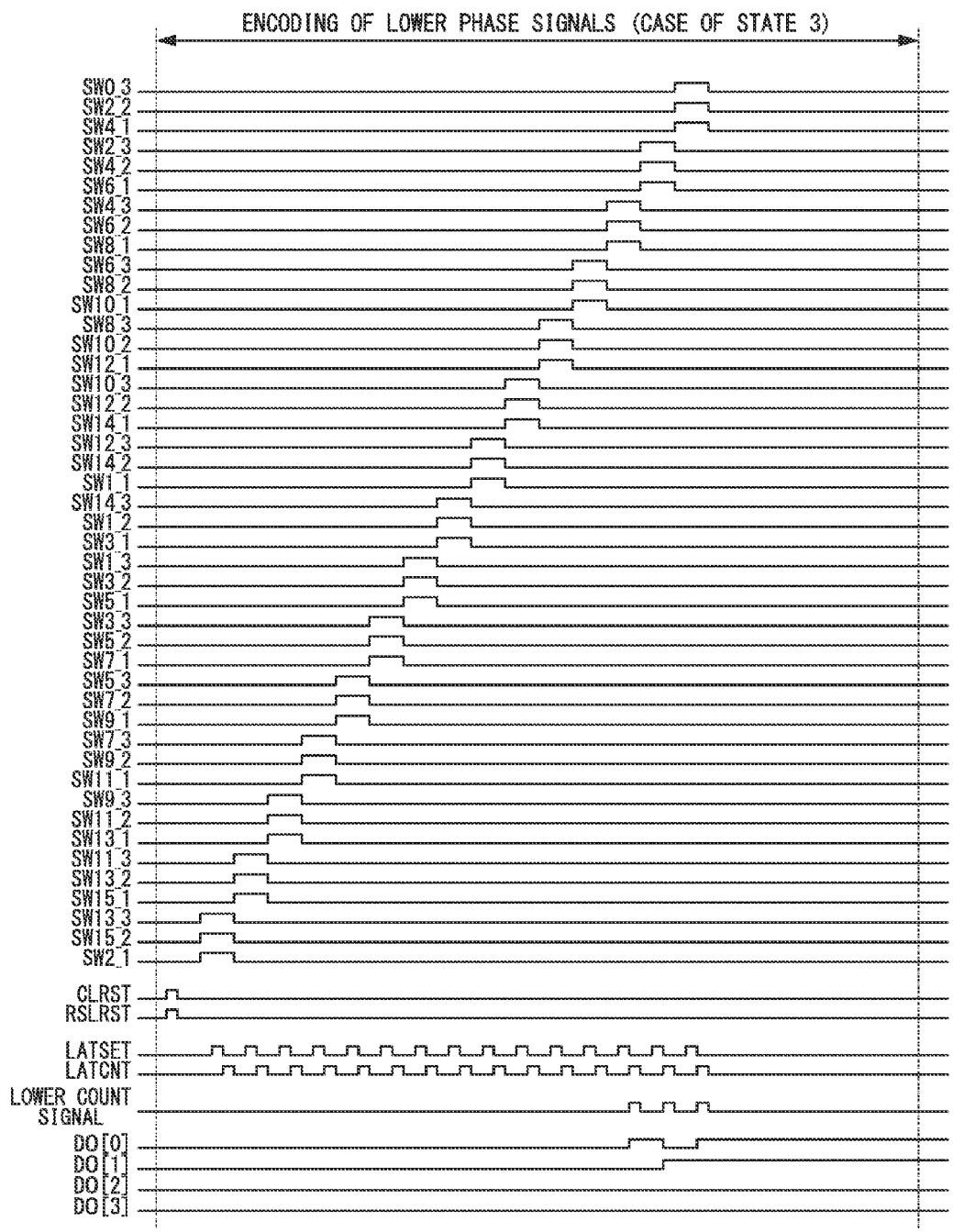
FIG. 7 is a timing chart illustrating an operation of the detection circuit and the encoding circuit constituting the column AD conversion unit included in the solid-state image pickup device in accordance with the second preferred embodiment of the present invention.

FIG. 7 illustrates a waveform of each signal according to an operation of the detection circuit 107 and the encoding circuit 106. Hereinafter, a case in which a state of the lower phase signals CK[0] to CK[15] latched in the latch unit 108 is "state 3" will be described by way of example. Among the following procedures (1) to (15), the operation of detecting logic states of "three nonconsecutive" lower phase signals is performed in procedure (1), and the operation of detecting logic states of "three consecutive" lower phase signals is performed in the other procedures.

Encoding Procedure
(Procedure 1)

First, when the control signals SW2_0, SW15_2, and SW13_3 rather than the control signals SW0_0, SW15_2, and SW13_3 enter an H state, a signal obtained by inverting the output signal (H state) of the latch circuit L_2 and a signal obtained by inverting the output signal (H state) of the latch circuit L_15 are input to the AND circuit AND0, and an output signal (H state) of the latch circuit L_13 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 2)

Subsequently, when the control signals SW15_1, SW13_2, and SW11_3 enter an H state, a signal obtained by inverting the output signal (H state) of the latch circuit L_15 and a signal obtained by inverting the output signal (H state) of the latch circuit L_13 are input to the AND circuit AND0, and an output signal (H state) of the latch circuit L_11 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 3)

Subsequently, when the control signals SW13_1, SW11_2, and SW9_3 enter an H state, a signal obtained by inverting the output signal (H state) of the latch circuit L_13 and a signal obtained by inverting the output signal (H state) of the latch circuit L_11 are input to the AND circuit AND0, and an output signal (H state) of the latch circuit L_9 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 4)

Subsequently, when the control signals SW11_1, SW9_2, and SW7_3 enter an H state, a signal obtained by inverting the output signal (H state) of the latch circuit L_11 and a signal obtained by inverting the output signal (H state) of the latch circuit L_9 are input to the AND circuit AND0, and an output signal (H state) of the latch circuit L_7 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 5)

Subsequently, when the control signals SW9_1, SW7_2, and SW5_3 enter an H state, a signal obtained by inverting the output signal (H state) of the latch circuit L_9 and a signal obtained by inverting the output signal (H state) of the latch circuit L_7 are input to the AND circuit AND0, and an output signal (an H state or an L state) of the latch circuit L_5 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 6)

Subsequently, when the control signals SW7_1, SW5_2, and SW3_3 enter an H state, a signal obtained by inverting the output signal (H state) of the latch circuit L_7 and a signal obtained by inverting the output signal (an H state or an L state) of the latch circuit L_5 are input to the AND circuit AND0, and an output signal (L state) of the latch circuit L_3 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 7)

Subsequently, when the control signals SW5_1, SW3_2, and SW1_3 enter an H state, a signal obtained by inverting the output signal (an H state or an L state) of the latch circuit L_5 and a signal obtained by inverting the output signal (L state) of the latch circuit L_3 are input to the AND circuit AND0, and an output signal (L state) of the latch circuit L_1 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 8)

Subsequently, when the control signals SW3_1, SW1_2, and SW14_3 enter an H state, a signal obtained by inverting the output signal (L state) of the latch circuit L_3 and a signal obtained by inverting the output signal (L state) of the latch circuit L_1 are input to the AND circuit AND0, and an output signal (L state) of the latch circuit L_14 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 9)

Subsequently, when the control signals SW1_1, SW14_2 and SW12_3 enter an H state, a signal obtained by inverting the output signal (L state) of the latch circuit L_1 and a signal obtained by inverting the output signal (L state) of the latch circuit L_14 are input to the AND circuit AND0, and an output signal (L state) of the latch circuit L_12 is input to the AND circuit AND0. Accordingly, the output signal of the AND circuit AND0 enters the L state. Since the output signal of the AND circuit AND0 is in the L state, the output signal of the AND circuit AND1 is in an L state and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 10)

Subsequently, when the control signals SW14_1, SW12_2, SW10_3 enter an H state, a signal obtained by inverting the output signal (L state) of the latch circuit L_14 and a signal obtained by inverting the output signal (L state) of the latch circuit L_12 are input to the AND circuit AND0, and an output signal (L state) of the latch circuit L_10 is input to the AND circuit AND0. Accordingly, the output signal of the AND circuit AND0 enters the L state. Since the output signal of the AND circuit AND0 is in the L state, the output signal of the AND circuit AND1 is in an L state and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 11)

Subsequently, when the control signals SW12_1, SW10_2, and SW8_3 enter an H state, a signal obtained by inverting the output signal (L state) of the latch circuit L_12 and a signal obtained by inverting the output signal (L state) of the latch circuit L_10 are input to the AND circuit AND0, and an output signal (L state) of the latch circuit L_8 is input to the AND circuit AND0. Accordingly, the output signal of the AND circuit AND0 enters the L state. Since the output signal of the AND circuit AND0 is in the L state, the output signal of the AND circuit AND1 is in an L state and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 12)

Subsequently, when the control signals SW10_1, SW8_2, and SW6_3 enter an H state, a signal obtained by inverting the output signal (L state) of the latch circuit L_10 and a signal obtained by inverting the output signal (L state) of the latch circuit L_8 are input to the AND circuit AND0, and an output signal (L state) of the latch circuit L_6 is input to the AND circuit AND0. Accordingly, the output signal of the AND circuit AND0 enters the L state. Since the output signal of the AND circuit AND0 is in the L state, the output signal of the AND circuit AND1 is in an L state, and the output signal of the RS latch RS0 is in an L state. Subsequently, the count signal LATCNT changes from an L state to an H state and enters the L state again, but the pulse of the lower count signal is not output from the AND circuit AND2. The output signal DO[3:0] of the encoding circuit 106 at this time point is 4'b0000.
(Procedure 13)

Subsequently, when the control signals SW8_1, SW6_2 and SW4_2 enter an H state, a signal obtained by inverting the output signal (L state) of the latch circuit L_8 and a signal obtained by inverting the output signal (L state) of the latch circuit L_6 are input to the AND circuit AND0, and an output signal (H state) of the latch circuit L_4 is input to the AND circuit AND0. Accordingly, the output signal of the AND circuit AND0 enters an H state. When the control signal LATSET changes from an L state to an H state, the output signal of the AND circuit AND1 enters the H state. Accordingly, the output signal of the RS latch RS0 enters the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0001.
(Procedure 14)

Subsequently, when the control signals SW6_1, SW4_1 and SW2_2 enter an H state, a signal obtained by inverting the output signal (L state) of the latch circuit L_6 and a signal obtained by inverting the output signal (H state) of the latch circuit L_4 are input to the AND circuit AND0, and an output signal (H state) of the latch circuit L_2 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0010.

(Procedure 15)

Finally, when the control signals SW4_1, SW2_2, and SW0_3 enter an H state, a signal obtained by inverting the output signal (H state) of the latch circuit L_4 and a signal obtained by inverting the output signal (H state) of the latch circuit L_2 are input to the AND circuit AND0, and an output signal (H state) of the latch circuit L_0 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0011.

Using the method described above, the encoding value (DO[3:0]=4'b0011) corresponding to "state 3" is established.

Figure 8:
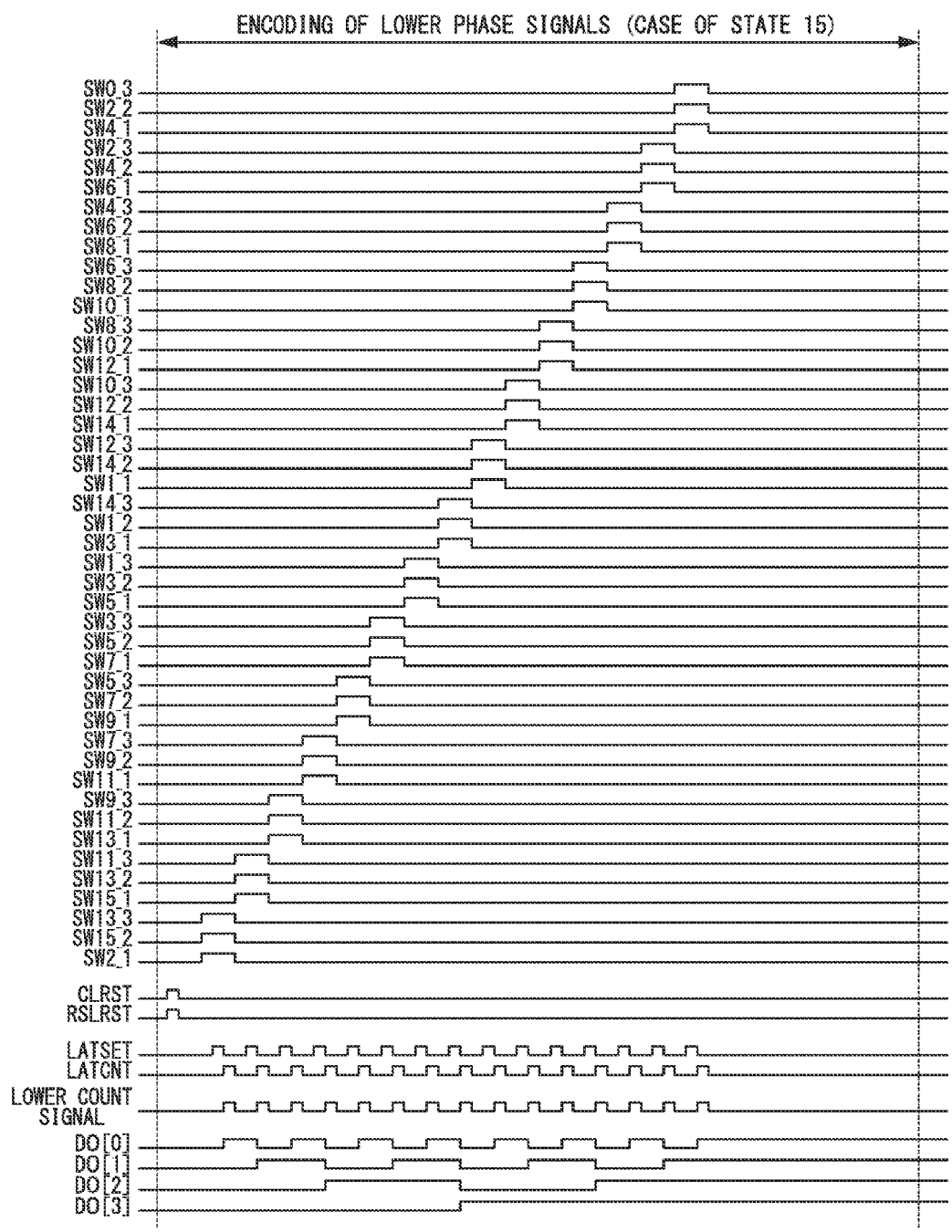
FIG. 8 is a timing chart illustrating an operation of the detection circuit and the encoding circuit constituting the column AD conversion unit included in the solid-state image pickup device in accordance with the second preferred embodiment of the present invention.

Next, a case in which the state of the lower phase signals CK[0] to CK[15] latched in the latch unit 108 is "state 15" and a phase of the lower phase signal CK[0] advances relative to a phase of the lower phase signal CK[15] due to influence of noise or the like will be described. FIG. 8 illustrates a waveform of each signal according to an operation of the detection circuit 107 and the encoding circuit 106. Hereinafter, it is assumed that the phase of the lower phase signal CK[0] advances relative to the phase of the lower phase signal CK[15] by a phase corresponding to a delay time for two delay units constituting the VCO 100. Among following procedures (1) to (15), the operation of detecting logic states of "three nonconsecutive" lower phase signals is performed in procedure (1), and the operation of detecting logic states of "three consecutive" lower phase signals is performed in the other procedures.

Encoding Procedure (Procedure 1)

First, when the control signals SW2_0, SW15_2, and SW13_3 rather than the control signals SW0_0, SW15_2, and SW13_3 enter an H state, a signal obtained by inverting the output signal (L state) of the latch circuit L_2 and a signal obtained by inverting the output signal (L state) of the latch circuit L_15 are input to the AND circuit AND0, and an output signal (H state) of the latch circuit L_13 is input to the AND circuit AND0. Accordingly, the output signal of the AND circuit AND0 enters the H state. When the control signal LATSET changes from an L state to an H state, the output signal of the AND circuit AND1 enters the H state. Accordingly, the output signal of the RS latch RS0 enters the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0001.

(Procedure 2)

Subsequently, when the control signals SW15_1, SW13_2, and SW11_3 enter an H state, a signal obtained by inverting the output signal (L state) of the latch circuit L_15 and a signal obtained by inverting the output signal (H state) of the latch circuit L_13 are input to the AND circuit AND0, and an output signal (H state) of the latch circuit L_11 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0010.

(Procedure 3)

Subsequently, when the control signals SW13_1, SW11_2, and SW9_3 enter an H state, a signal obtained by inverting the output signal (H state) of the latch circuit L_13 and a signal obtained by inverting the output signal (H state) of the latch circuit L_11 are input to the AND circuit AND0, and an output signal (H state) of the latch circuit L_9 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0011.

(Procedure 4)

Subsequently, when the control signals SW11_1, SW9_2, and SW7_3 enter an H state, a signal obtained by inverting the output signal (H state) of the latch circuit L_11 and a signal obtained by inverting the output signal (H state) of the latch circuit L_9 are input to the AND circuit AND0, and an output signal (H state) of the latch circuit L_7 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0100.

(Procedure 5)

Subsequently, when the control signals SW9_1, SW7_2, and SW5_3 enter an H state, a signal obtained by inverting the output signal (H state) of the latch circuit L_9 and a signal obtained by inverting the output signal (H state) of the latch circuit L_7 are input to the AND circuit AND0, and an output signal (H state) of the latch circuit L_5 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0101.

(Procedure 6)

Subsequently, when the control signals SW7_1, SW5_2, and SW3_3 enter an H state, a signal obtained by inverting the output signal (H state) of the latch circuit L_7 and a signal obtained by inverting the output signal (H state) of the latch circuit L_5 are input to the AND circuit AND0, and an output signal (H state) of the latch circuit L_3 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0110.

(Procedure 7)

Subsequently, when the control signals SW5_1, SW3_2, and SW1_3 enter an H state, a signal obtained by inverting the output signal (H state) of the latch circuit L_5 and a signal obtained by inverting the output signal (H state) of the latch circuit L_3 are input to the AND circuit AND0, and an output signal (H state) of the latch circuit L_1 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b0111.

(Procedure 8)

Subsequently, when the control signals SW3_1, SW1_2, and SW14_3 enter an H state, a signal obtained by inverting the output signal (H state) of the latch circuit L_3 and a signal obtained by inverting the output signal (H state) of the latch circuit L_1 are input to the AND circuit AND0, and an output signal (an H state or an L state) of the latch circuit L_14 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1000.

(Procedure 9)

Subsequently, when the control signals SW1_1, SW14_2 and SW12_3 enter an H state, a signal obtained by inverting the output signal (H state) of the latch circuit L_1 and a signal obtained by inverting the output signal (an H state or an L state) of the latch circuit L_14 are input to the AND circuit AND0, and an output signal (L state) of the latch circuit L_12 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1001.

(Procedure 10)

Subsequently, when the control signals SW14_1, SW12_2, SW10_3 enter an H state, a signal obtained by inverting the output signal (an H state or an L state) of the latch circuit L_14 and a signal obtained by inverting the output signal (L state) of the latch circuit L_12 are input to the AND circuit AND0, and an output signal (L state) of the latch circuit L_10 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1010.

(Procedure 11)

Subsequently, when the control signals SW12_1, SW10_2, and SW8_3 enter an H state, a signal obtained by inverting the output signal (L state) of the latch circuit L_12 and a signal obtained by inverting the output signal (L state) of the latch circuit L_10 are input to the AND circuit AND0, and an output signal (L state) of the latch circuit L_8 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1011.

(Procedure 12)

Subsequently, when the control signals SW10_1, SW8_2, and SW6_3 enter an H state, a signal obtained by inverting the output signal (L state) of the latch circuit L_10 and a signal obtained by inverting the output signal (L state) of the latch circuit L_8 are input to the AND circuit AND0, and an output signal (L state) of the latch circuit L_6 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1100.

(Procedure 13)

Subsequently, when the control signals SW8_1, SW6_2 and SW4_2 enter an H state, a signal obtained by inverting the output signal (L state) of the latch circuit L_8 and a signal obtained by inverting the output signal (L state) of the latch circuit L_6 are input to the AND circuit AND0, and an output signal (L state) of the latch circuit L_4 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1101.

(Procedure 14)

Subsequently, when the control signals SW6_1, SW4_1 and SW2_2 enter an H state, a signal obtained by inverting the output signal (L state) of the latch circuit L_6 and a signal obtained by inverting the output signal (L state) of the latch circuit L_4 are input to the AND circuit AND0, and an output signal (L state) of the latch circuit L_2 is input to the AND circuit AND0. Accordingly, the output signal of the AND circuit AND0 enters the L state. Since the output signal of the AND circuit AND0 is in the L state, the output signal of the AND circuit AND1 is in an L state, but since the control signal RSLRST input to the RS latch RS0 is in an L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1110.

(Procedure 15)

Finally, when the control signals SW4_1, SW2_2, and SW0_3 enter an H state, a signal obtained by inverting the output signal (L state) of the latch circuit L_4 and a signal obtained by inverting the output signal (L state) of the latch circuit L_2 are input to the AND circuit AND0, and an output signal (H state) of the latch circuit L_0 is input to the AND circuit AND0. Accordingly, the output signal of the AND circuit AND0 enters the H state. When the control signal LATSET changes from an L state to an H state, the output signal of the AND circuit AND1 enters the H state, but since the control signal RSLRST input to the RS latch RS0 is L state, the output signal of the RS latch RS0 is in the H state. Subsequently, when the count signal LATCNT changes from an L state to an H state and enters the L state again, the lower count signal for one pulse is output from the AND circuit AND2. The output signal DO[3:0] of the encoding circuit 106 at this time point is 4'b1111.

Using the method described above, the encoding value (DO[3:0]=4'b1111) corresponding to "state 15" is established. When the phase of the lower phase signal CK[0] advances relative to the phase of the lower phase signal CK[15], the lower phase signal CK[0] latched in the latch unit 108 may enter the H state, the lower phase signal CK[15] may enter the L state, and the lower phase signal CK[13] may enter the H state. In this state, when encoding is performed using a conventional encoding method (a method of detecting that a logic state of the "three consecutive" lower phase signals is a predetermined logic state "001"), the output signals of the AND circuits AND0 and AND1 enter the L state since the lower phase signals CK[0], CK[15] and CK[13] latched in the latch unit 108 are in the H state, the L state, and the H state, respectively, and the pulse of the lower count signal is not output from the AND circuit AND2 since the output signal of the RS latch RS0 enters the L state, in procedure (1).

Therefore, in procedures (1) to (14), the pulse of the lower count signal is not output from the AND circuit AND2, and in procedure (15), the lower count signal for one pulse is output from the AND circuit AND2. Accordingly, the output signal DO[3:0] of the encoding circuit 106 when procedure (15) ends is 4'b0001 and an error of "14" that is a difference between "15" and "1" occurs in the lower data. In contrast, in the present preferred embodiment, even when the phase of the lower phase signal CK[0] advances relative to the phase of the lower phase signal CK[15], an error does not occur in the encoding when the state of the lower phase signals CK[0] to CK[15] is "state 15."

As described above, according to the present preferred embodiment, in the operation of detecting the logic state of the three lower phase signals, it is possible to reduce the occurrence of the error in the encoding of the lower phase signals by performing the operation of detecting logic states of "three nonconsecutive" lower phase signals. Therefore, it is possible to perform high precision AD conversion in the TDC type AD conversion circuit and the solid-state image pickup device using the same.

Third Preferred Embodiment

Figure 9:
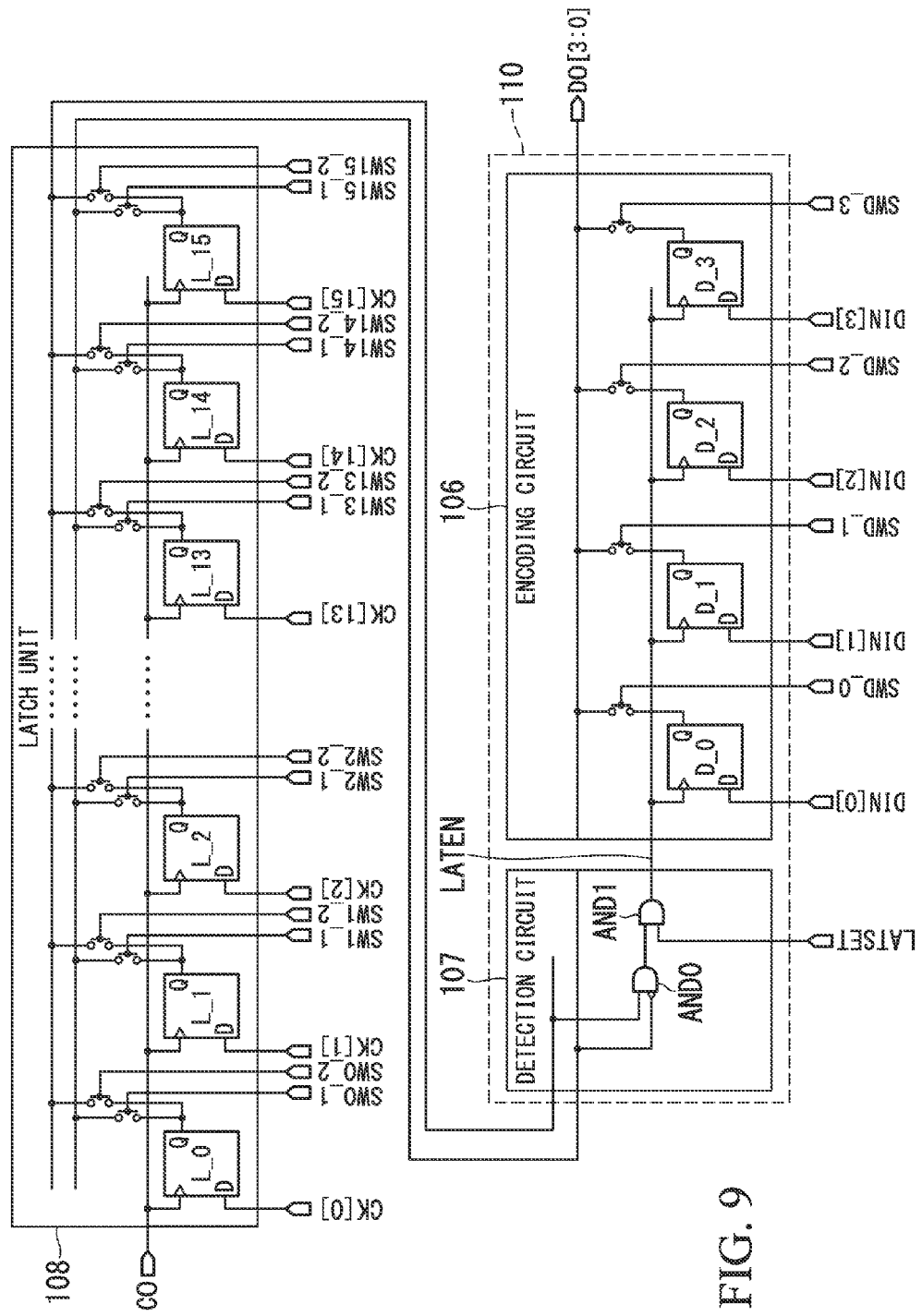
FIG. 9 is a circuit diagram illustrating a configuration of a latch unit, a detection circuit, and an encoding circuit constituting a column AD conversion unit included in a solid-state image pickup device in accordance with a third preferred embodiment of the present invention.

Next, a third preferred embodiment of the present invention will be described. FIG. 9 illustrates a configuration of a latch unit 108, a detection circuit 107, and an encoding circuit 106 of the present preferred embodiment. In the present preferred embodiment, a configuration is changed to detect logic states of two lower phase signals rather than three lower phase signals.

The latch unit 108 includes latch circuits L_0 to L_15 that latch logic states of lower phase signals CK[0] to CK[15] at a time point at which the comparison output CO from the comparison unit 109 is inverted. Control signals SW0_1 to SW15_1 and SW0_2 to SW15_2 are signals controlling switches for outputting a desired lower phase signal from among lower phase signals CK[0] to CK[15] latched in the latch circuits L_0 to L_15, to the detection circuit 107.

The detection circuit 107 includes AND circuits AND0 and AND1. A lower phase signal output from any one of the latch circuits L_0 to L_15 and a signal obtained by inverting a lower phase signal output from another one of the latch circuits L_0 to L_15 are input to the AND circuit AND0. The AND circuit AND0 performs an AND operation of the two input signals. An output signal of the AND circuit AND0 and a control signal LATSET are input to the AND circuit AND1. The AND circuit AND1 performs an AND operation on the two input signals, and outputs a result thereof as a detection result LATEN (state detection signal) having a predetermined logic state.

The encoding circuit 106 includes latch circuits D_0 to D_3 for encoding. Since a configuration of the encoding circuit 106 is similar to the configuration of the encoding circuit 106 in the first preferred embodiment, a description will be omitted. Further, this is an example, and the present invention is not necessarily limited to this.

Next, an operation of the detection circuit 107 and the encoding circuit 106 will be described. In the present preferred embodiment, logic states of two lower phase signals in a signal group (signal sequence) in which lower phase signals CK[0], CK[2], CK[4], CK[6], CK[8], CK[10], CK[12], CK[14], CK[1], CK[3], CK[5], CK[7], CK[9], CK[11], CK[13] and CK[15] latched in the latch unit 108 are arranged in this order as shown in FIG. 13 are detected to be an L state and an H state sequentially, and an encoding value is determined according to a position in which the logic state is detected.

In an operation of detecting logic states of two lower phase signals (a first detection operation), an operation of detecting the logic states of "two consecutive" lower phase signals in the signal group (signal sequence) arranged as described above, and an operation of detecting logic states of "two nonconsecutive" lower phase signals (a second detection operation) are performed.

The lower phase signals are input from the two latch circuits selected from among the latch circuits L__0 to L__15 in which the lower phase signals CK[0] to CK[15] have been held to the detection circuit 107 by control signals SW0__1 to SW15__1 and SW0__2 to SW15__2, and the logic states of the input lower phase signals are detected. Encoding values DIN[0] to DIN[3] when a result of the AND operation in the AND circuit AND0 is an H state are an encoding result. Hereinafter, a detailed operation will be described.

Figure 10:
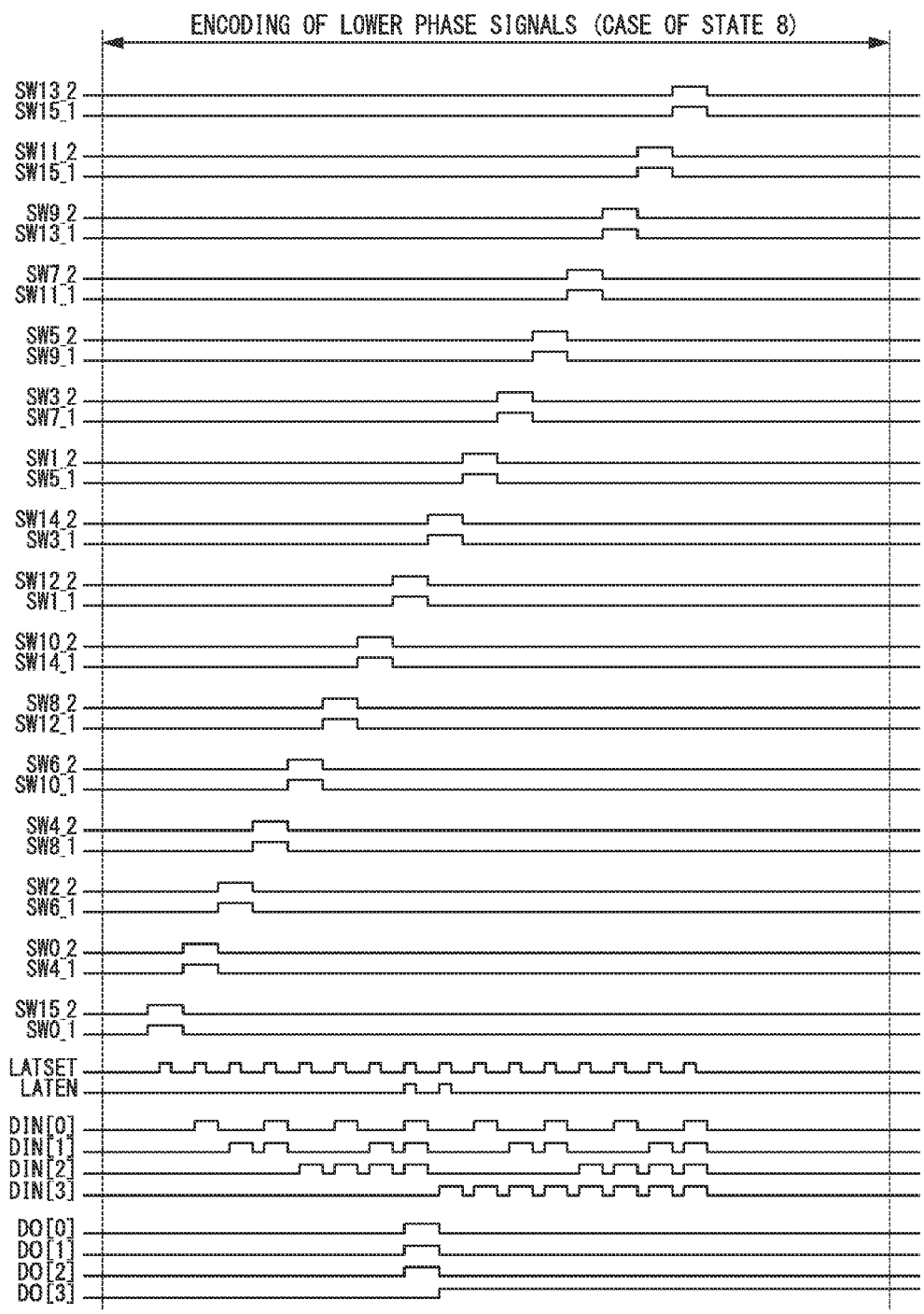
FIG. 10 is a timing chart illustrating an operation of the detection circuit and the encoding circuit constituting the column AD conversion unit included in the solid-state image pickup device in accordance with the third preferred embodiment of the present invention.

FIG. 10 illustrates a waveform of each signal according to an operation of the detection circuit 107 and the encoding circuit 106. Hereinafter, a case in which a state of the lower phase signals CK[0] to CK[15] latched in the latch unit 108 is "state 8" and a phase of the lower phase signal CK[11] lags relative to a phase of the lower phase signal CK[13] due to influence of noise or the like will be described. Hereinafter, it is assumed that the phase of the lower phase signal CK[11] lags relative to the phase of the lower phase signal CK[13] by a phase corresponding to a delay time for two delay units constituting the VCO 100. Among the following procedures (1) to (16), the operation of detecting logic states of "two consecutive" lower phase signals is performed in procedure (1) and procedure (16), and the operation of detecting logic states of "two nonconsecutive" lower phase signals is performed in the other procedures.

Encoding Procedure
(Procedure 1)

First, when the control signals SW0__1 and SW15__2 enter an H state, a signal obtained by inverting the output signal (an H state or an L state) of the latch circuit L__0 is input to the AND circuit AND0, and the output signal (an H state or an L state) of the latch circuit L__15 is input to the AND circuit AND0. Accordingly, an output signal of the AND circuit AND0 enters the L state. Since the output signal of the AND circuit AND0 is in the L state, an output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 2)

Subsequently, when the control signals SW4__1 and SW0__2 rather than the control signals SW2__1 and SW0__2 enter an H state, a signal obtained by inverting the output signal (H state) of the latch circuit L__4 is input to the AND circuit AND0, and an output signal (an H state or an L state) of the latch circuit L__0 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 3)

Subsequently, when the control signals SW6__1 and SW2__2 rather than the control signals SW4__1 and SW2__2 enter an H state, a signal obtained by inverting the output signal (H state) of the latch circuit L__6 is input to the AND circuit AND0, and the output signal (H state) of the latch circuit L__2 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 4)

Subsequently, when the control signals SW8__1 and SW4__2 rather than the control signals SW6__1 and SW4__2 enter an H state, a signal obtained by inverting the output signal (H state) of the latch circuit L__8 is input to the AND circuit AND0, and an output signal (H state) of the latch circuit L__4 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 5)

Subsequently, when the control signals SW10__1 and SW6__2 rather than the control signals SW8__1 and SW6__2 enter an H state, a signal obtained by inverting the output signal (H state) of the latch circuit L__10 is input to the AND circuit AND0, and the output signal (H state) of the latch circuit L__6 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 6)

Subsequently, when the control signals SW12__1 and SW8__2 rather than the control signals SW10__1 and SW8__2 enter an H state, a signal obtained by inverting the output signal (H state) of the latch circuit L__12 is input to the AND circuit AND0, and the output signal (H state) of the latch circuit L__8 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 7)

Subsequently, when the control signals SW14__1 and SW10__2 rather than the control signals SW12__1 and SW10__2 enter an H state, a signal obtained by inverting the output signal (H state) of the latch circuit L__14 is input to the AND circuit AND0, and the output signal (H state) of the latch circuit L__10 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b0000.

(Procedure 8)

Subsequently, when the control signals SW1_1 and SW12_2 rather than the control signals SW14_1 and SW12_2 enter an H state, a signal obtained by inverting the output signal (L state) of the latch circuit L_1 is input to the AND circuit AND0, and the output signal (H state) of the latch circuit L_12 is input to the AND circuit AND0. Accordingly, the output signal of the AND circuit AND0 enters the H state. Subsequently, the control signal LATSET changes from an L state to an H state and then back to the L state. Accordingly, the detection result LATEN changes from an L state to an H state and then back to the L state, and an encoding value (DIN[3:0]=4'b0111) of this time is held in the encoding circuit 106. The output signal DO[3:0] of the encoding circuit 106 at this time point is 4'b0111.

(Procedure 9)

Subsequently, when the control signals SW3_1 and SW14_2 rather than the control signals SW1_1 and SW14_2 enter an H state, a signal obtained by inverting the output signal (L state) of the latch circuit L_3 is input to the AND circuit AND0, and the output signal (H state) of the latch circuit L_14 is input to the AND circuit AND0. Accordingly, the output signal of the AND circuit AND0 enters the H state. Subsequently, the control signal LATSET changes from an L state to an H state and then back to the L state. The detection result LATEN changes from an L state to an H state and then back to the L state, and an encoding value (DIN[3:0]=4'b1000) of this time is held in the encoding circuit 106 again.

The output signal DO[3:0] of the encoding circuit 106 at this time point is 4'b1000.

(Procedure 10)

Subsequently, when the control signals SW5_1 and SW1_2 rather than the control signals SW3_1 and SW1_2 enter an H state, a signal obtained by inverting the output signal (L state) of the latch circuit L_5 is input to the AND circuit AND0, and the output signal (L state) of the latch circuit L_1 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 11)

Subsequently, when the control signals SW7_1 and SW3_2 rather than the control signals SW5_1 and SW3_2 enter an H state, a signal obtained by inverting the output signal (L state) of the latch circuit L_7 is input to the AND circuit AND0, and the output signal (L state) of the latch circuit L_3 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 12)

Subsequently, when the control signals SW9_1 and SW5_2 rather than the control signals SW7_1 and SW5_2 enter an H state, a signal obtained by inverting the output signal (L state) of the latch circuit L_9 is input to the AND circuit AND0, and the output signal (L state) of the latch circuit L_5 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 13)

Subsequently, when the control signals SW11_1 and SW7_2 rather than the control signals SW9_1 and SW7_2 enter an H state, a signal obtained by inverting the output signal (an H state or an L state) of the latch circuit L_11 is input to the AND circuit AND0, and the output signal (L state) of the latch circuit L_7 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 14)

Subsequently, when the control signals SW13_1 and SW9_2 rather than the control signals SW11_1 and SW9_2 enter an H state, a signal obtained by inverting the output signal (L state) of the latch circuit L_13 is input to the AND circuit AND0, and the output signal (L state) of the latch circuit L_9 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 15)

Subsequently, when the control signals SW15_1 and SW11_2 rather than the control signals SW13_1 and SW11_2 enter an H state, a signal obtained by inverting the output signal (an H state or an L state) of the latch circuit L_15 is input to the AND circuit AND0, and the output signal (an H state or an L state) of the latch circuit L_11 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

(Procedure 16)

Finally, when the control signals SW15_1 and SW13_2 enter an H state, a signal obtained by inverting the output signal (an H state or an L state) of the latch circuit L_15 is input to the AND circuit AND0, and the output signal (L state) of the latch circuit L_13 is input to the AND circuit AND0. Accordingly, the output signal of the AND circuit AND0 enters the L state. Since the output signal of the AND circuit AND0 is in the L state, the output signal of the AND circuit AND1 is in an L state. Subsequently, the control signal LATSET changes from an L state to an H state and then back to the L state. Meanwhile, the detection result LATEN remains unchanged in the L state. The output signal DO[3:0] of the encoding circuit 106 at this time point is 4'b1000.

Using the method described above, an encoding value (DO [3:0]=4'b1000) corresponding to "state 8" is established. When the phase of the lower phase signal CK[11] lags relative to the phase of the lower phase signal CK[13], the lower phase signal CK[13] latched in the latch unit 108 may enter the L state and the lower phase signal CK[11] may enter the H state. In this state, if encoding is performed using a conventional encoding method (a method of detecting that a logic state of "two consecutive" lower phase signals is a predetermined logic state "01"), the detection result LATEN enters the H state since the lower phase signals CK[13] and CK[11] latched in the latch unit 108 are in the L state and the H state, respectively, in procedure (15). Therefore, the output signal DO[3:0] of the encoding circuit 106 is 4'b1110, and an error of "6" that is a difference between "14" and "8" occurs in the lower data. In contrast, in the present preferred embodiment, even when the phase of the lower phase signal CK[11] lags relative to the phase of the lower phase signal CK[13], an error does not occur in the encoding when a state of the lower phase signals CK[0] to CK[15] is "state 8."

Further, in the present preferred embodiment, the operation of detecting the logic states of "two nonconsecutive" lower phase signals is performed plural times. Therefore, an encoding error does not occur even when the phase of the lower phase signal advances or lags due to influence of noise or the like except for a case in which the phase of the lower phase signal CK[11] lags relative to the phase of the lower phase signal CK[13] as described above.

As described above, according to the present preferred embodiment, in the operation of detecting the logic states of the two lower phase signals, it is possible to reduce the occurrence of the error in the encoding of the lower phase signals by performing the operation of detecting the logic states of the "two nonconsecutive" lower phase signals. Therefore, it is possible to perform high precision AD conversion in the TDC type AD conversion circuit and the solid-state image pickup device using the same.

The present invention provides the AD conversion circuit and the solid-state image pickup device capable of reducing the occurrence of the error in the encoding of the lower phase signals.

According to the preferred embodiments of the present invention, it is possible to reduce the occurrence of the error in the encoding of the lower phase signals by performing, at least once, the second detection operation of detecting the logic states of the n nonconsecutive lower phase signals in the first detection operation of detecting the logic states of the n lower phase signals (n is a natural number equal to or greater than 2).

While the case in which the counting unit 105 performs the counting at the rising edge of the lower phase signal has been described above by way of example, the counting unit 105 may also perform the counting at a falling edge of the lower phase signal.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An AD conversion circuit comprising:
a reference signal generation unit configured to generate a reference signal increasing or decreasing over time;
a comparison unit configured to compare an analog signal that is a target of an AD conversion with the reference signal, the comparison unit being configured to terminate a comparison process at a timing at which the reference signal meets a predetermined condition for the analog signal;
a clock generation unit that includes a delay circuit including a plurality of delay units connected to each other, the clock generation unit being configured to output a plurality of lower phase signals based on output signals of the delay circuit;
a latch unit configured to latch the plurality of lower phase signals at a timing according to a termination of the comparison process;
a counting unit including a counter circuit configured to perform counting by using a signal based on any one of the plurality of lower phase signals as a count clock so as to acquire an upper count value; and
an encoding unit including a detection circuit and an encoding circuit, the detection circuit being configured to perform a first detection operation of detecting logic states of n lower phase signals (n is a natural number equal to or greater than 2) in a signal group that the plurality of lower phase signals, which has been latched in the latch unit, are arranged in the same order as those of the signal group when the plurality of lower phase signals, which are output from the clock generation unit during the comparison process, are arranged to be the signal group in which the lower phase signals rise or fall sequentially at predetermined time intervals according to on which of a rising edge and a falling edge of the count clock counting performed by the counter circuit is based, while selecting the n lower phase signals in a predetermined order, the detection circuit being configured to output a state detection signal when the logic state of the n lower phase signals is detected to be a predetermined logic state in the first detection operation, the encoding circuit being configured to perform encoding based on the state detection signal output from the detection circuit,
wherein the detection circuit is configured to perform, at least once, a second detection operation of detecting the logic states of the n lower phase signals that are not n-consecutive in the first detection operation.

2. The AD conversion circuit according to claim 1, wherein n is 3, and
the detection circuit is configured to perform, at least once, the second detection operation of detecting logic states of two lower phase signals that are consecutive in the signal group that the plurality of lower phase signals latched in the latch unit are arranged, and one lower phase signal not consecutive to either of the two lower phase signals.

3. A solid-state image pickup device comprising:
an image capturing unit including a plurality of pixels arranged in a matrix form, each pixel including a photoelectric conversion element and outputting a pixel signal; and
an AD conversion circuit according to claim 1 to which an analog signal according to the pixel signal is input,
wherein the comparison unit, the latch unit, the counting unit and the encoding unit included in the AD conversion circuit are provided in each column or each plurality of columns of an array of pixels of the image capturing unit.

4. A solid-state image pickup device comprising:

an image capturing unit including a plurality of pixels arranged in a matrix form, each pixel including a photoelectric conversion element and outputting a pixel signal; and an AD conversion circuit according to claim 2 to which an analog signal according to the pixel signal is input, wherein the comparison unit, the latch unit, the counting unit and the encoding unit included in the AD conversion circuit are provided in each column or each plurality of columns of an array of pixels of the image capturing unit.

* * * * *